(12) United States Patent
Tanaka et al.

(10) Patent No.: US 10,050,837 B2
(45) Date of Patent: Aug. 14, 2018

(54) COMPUTER-READABLE RECORDING MEDIUM, COMMAND GENERATION METHOD AND INFORMATION PROCESSING APPARATUS

(71) Applicant: FUJITSU LIMITED, Kawasaki-shi, Kanagawa (JP)

(72) Inventors: Atsushi Tanaka, Yokohama (JP); Mitsutaka Fujimoto, Takarazuka (JP); Yoshiaki Nakagawa, Nishio (JP); Shinichi Miyazaki, Hiroshima (JP)

(73) Assignee: FUJITSU LIMITED, Kawasaki (JP)

( * ) Notice: Subject to any disclaimer, the term of this patent is extended or adjusted under 35 U.S.C. 154(b) by 207 days.

(21) Appl. No.: 15/062,545

(22) Filed: Mar. 7, 2016

(65) Prior Publication Data
US 2016/0294626 A1    Oct. 6, 2016

(30) Foreign Application Priority Data

Mar. 31, 2015  (JP) ................................. 2015-073068

(51) Int. Cl.
  *H04L 12/24* (2006.01)
  *H04L 29/08* (2006.01)
(52) U.S. Cl.
  CPC ...... *H04L 41/0893* (2013.01); *H04L 41/0843* (2013.01); *H04L 67/1044* (2013.01); *H04L 41/082* (2013.01)
(58) Field of Classification Search
  CPC ............. H04L 41/0893; H04L 41/0843; H04L 41/082; H04L 67/10; H04L 67/104; H04L 67/1044
(Continued)

(56) References Cited

U.S. PATENT DOCUMENTS 9,755,965 B1 *  9/2017  Yadav ..................... H04L 45/54
2004/0117452 A1  6/2004  Lee et al.
(Continued)

FOREIGN PATENT DOCUMENTS

CA        2281367        3/2001
JP       2007-87268       4/2007
WO   WO 2007/086129 A1   8/2007

OTHER PUBLICATIONS

ONF, "OpenFlow Switch Specification—Version 1.5.0 ( Protocol version 0x06 )", Dec. 19, 2014, Open Networking Foundation, https://www.opennetworking.org/images/stories/downloads/sdn-resources/onf-specifications/openflow/openflow-switch-v1.5.0.noipr.pdf.*

(Continued)

*Primary Examiner* — Ruolei Zong
(74) *Attorney, Agent, or Firm* — Staas & Halsey LLP

(57) ABSTRACT

A non-transitory computer-readable recoding medium having stored therein a program for causing a computer to execute a process. The process includes permitting specifying of devices that are made to belong to a device group to which a particular command template for instructing execution of a particular function is applied, over a plurality of types of devices, receiving specifying of a device that is to belong to the device group and specifying of the particular function that the device is made to perform, and generating a command that is applied to a device group to which the specified device belongs and that is used for controlling the specified device on the basis of a particular command template for performing the particular function.

11 Claims, 26 Drawing Sheets

(58) Field of Classification Search
USPC .......................................................... 709/220
See application file for complete search history.

(56) References Cited

U.S. PATENT DOCUMENTS

| | | |
|---|---|---|
| 2008/0250127 A1 | 10/2008 | Sugisawa |
| 2010/0037287 A1 | 2/2010 | Netrakanti et al. |
| 2014/0059197 A1* | 2/2014 | Kitajima ................. H04L 41/50 709/223 |
| 2015/0023210 A1* | 1/2015 | Kis ..................... H04L 41/0806 370/254 |
| 2016/0062746 A1* | 3/2016 | Chiosi ....................... G06F 8/35 717/104 |

OTHER PUBLICATIONS

Extended European Search Report dated Jul. 19, 2016 in corresponding European Patent Application No. 16158922.1.

* cited by examiner

DEVICE TABLE

| DEVICE ID | DEVICE NAME | DEVICE GROUP ID | IP ADDRESS | ADMINISTRATOR ID | ADMINISTRATOR PASSWORD |
|---|---|---|---|---|---|
| DV-01 | 11F ROUTER 1 | Gr-A | 192.168.11.101 | admin | abc123 |
| DV-02 | 11F ROUTER 2 | Gr-A | 192.168.11.102 | admin | def456 |
| DV-03 | 11F ROUTER 3 | Gr-A | 192.168.11.103 | admin | ghi789 |
| DV-04 | 11F ROUTER 4 | Gr-A | 192.168.11.104 | admin | abc456 |
| DV-05 | 12F ROUTER 1 | Gr-B | 192.168.12.101 | admin | def789 |
| DV-06 | 12F ROUTER 2 | Gr-B | 192.168.12.102 | admin | ghi123 |
| DV-07 | 12F ROUTER 3 | Gr-C | 192.168.17.103 | admin | abc789 |
| DV-08 | 12F ROUTER 4 | Gr-C | 192.168.18.104 | admin | def123 |

F I G. 3

FUNCTION TABLE

| DEVICE GROUP ID | FUNCTION NAME | COMMAND TEMPLATE FILE NAME |
| --- | --- | --- |
| Gr-A | VLAN SETTING FUNCTION | func001.conf |
| Gr-A | COMMUNICATION SPEED SETTING FUNCTION | func002.conf |
| Gr-B | VLAN SETTING FUNCTION | func003.conf |
| Gr-A | VLAN LISTING FUNCTION | func004.conf |
| Gr-C | COMMUNICATION SPEED SETTING FUNCTION | func005.conf |
| ... | ... | ... |

F I G. 4

DEVICE GROUP TABLE

| DEVICE GROUP ID | DEVICE GROUP NAME | STORAGE SETTING FILE NAME |
|---|---|---|
| Gr—A | Gr—A SERIES | GrA_save.conf |
| Gr—B | Gr—B SERIES | GrB_save.conf |
| Gr—C | Gr—C SERIES | GrC_save.conf |

F I G. 5

COMMAND TEMPLATE FILE (FILE NAME : func001.conf)

FUNCTION NAME : VLAN SETTING FUNCTION

TARGET DEVICE GROUP : Gr-A

STORING-NECESSITY INDICATION : NECESSITY

EXECUTION
PERMISSION : ADMINISTRATOR, GENERAL USERS
AUTHORITY

COMMAND TEMPLATE DESCRIPTION PORTION →

```
COMMAND TEMPLATE
  swith port %INTERFACE NUMBER %
  vlan tag %VLAN ID%
```

PARAMETER DEFINITION

PARAMETER NAME : INTERFACE NUMBER
TYPE : NUMERIC VALUE
MINIMUM VALUE : 1
MAXIMUM VALUE : 256

PARAMETER NAME : VLAN ID
TYPE : NUMERIC VALUE
MINIMUM VALUE : 1
MAXIMUM VALUE : 4095

FIG. 6

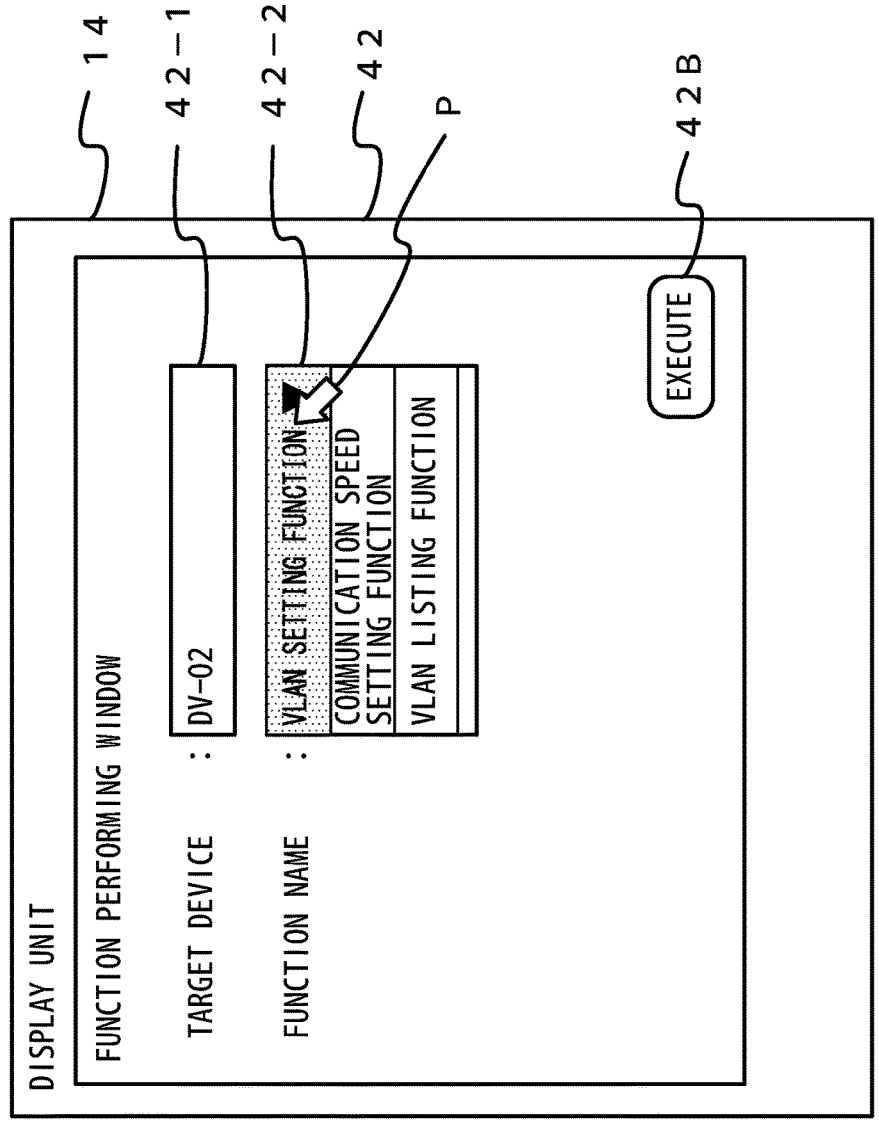
F I G. 11

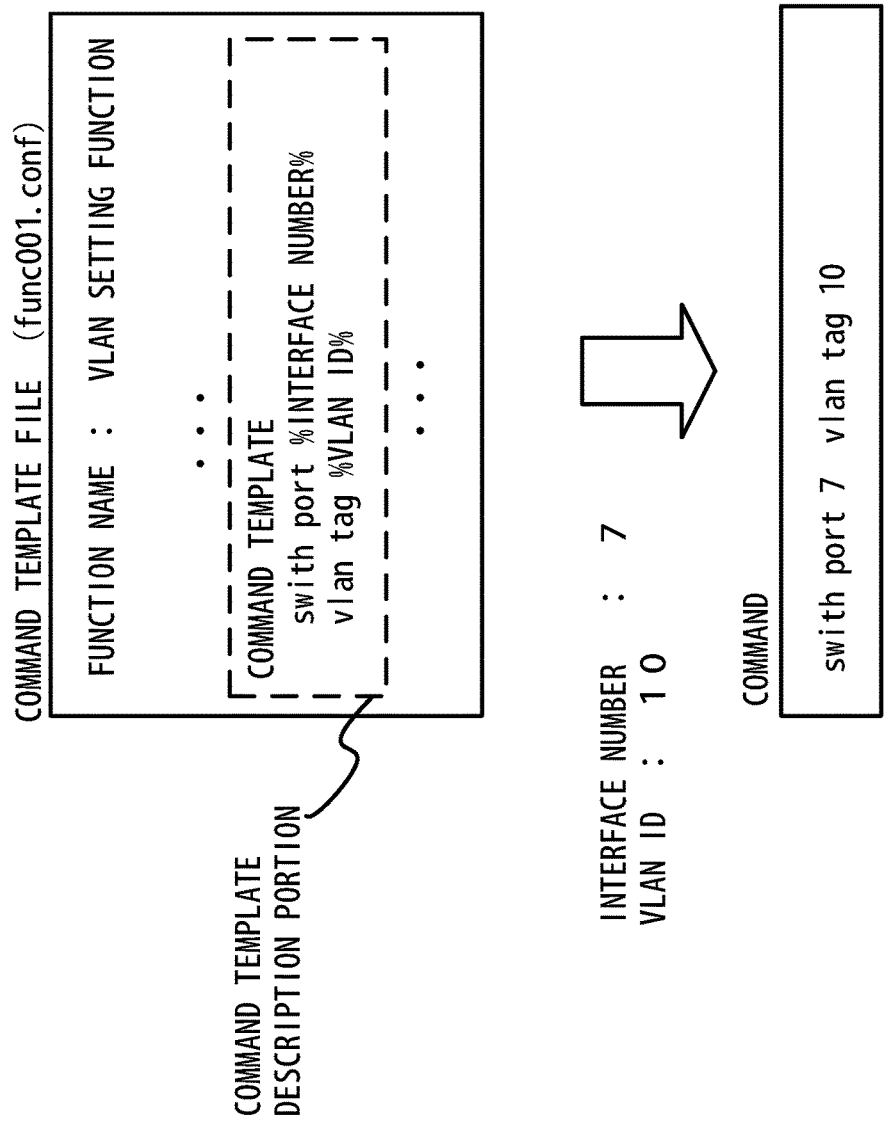
F I G. 13

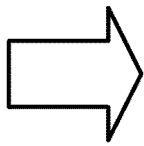
F I G. 1 5

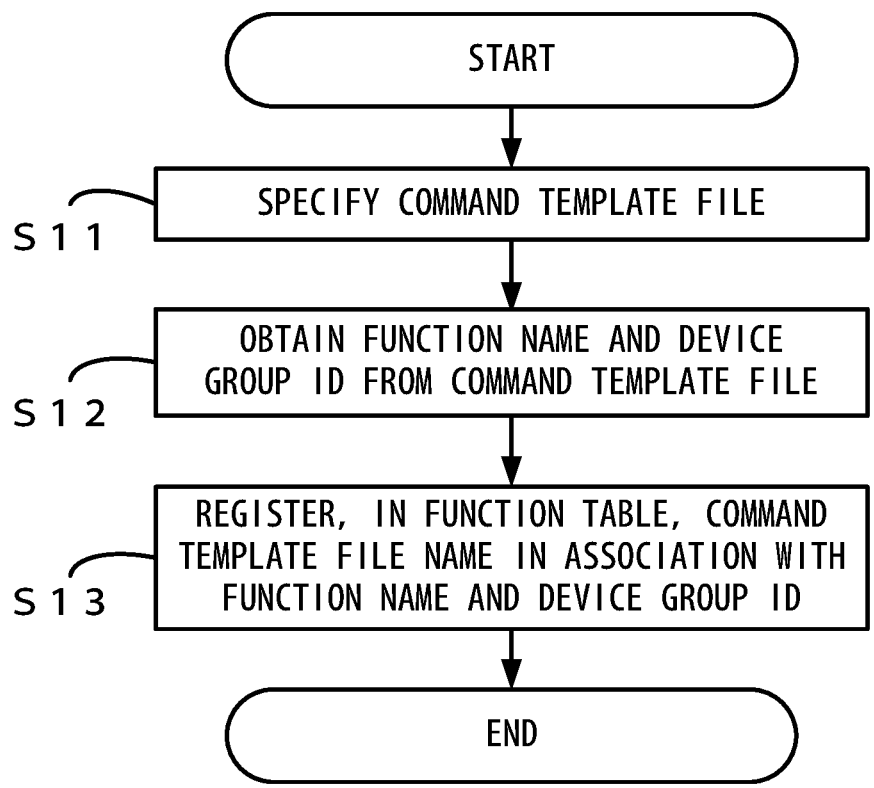
F I G. 1 8

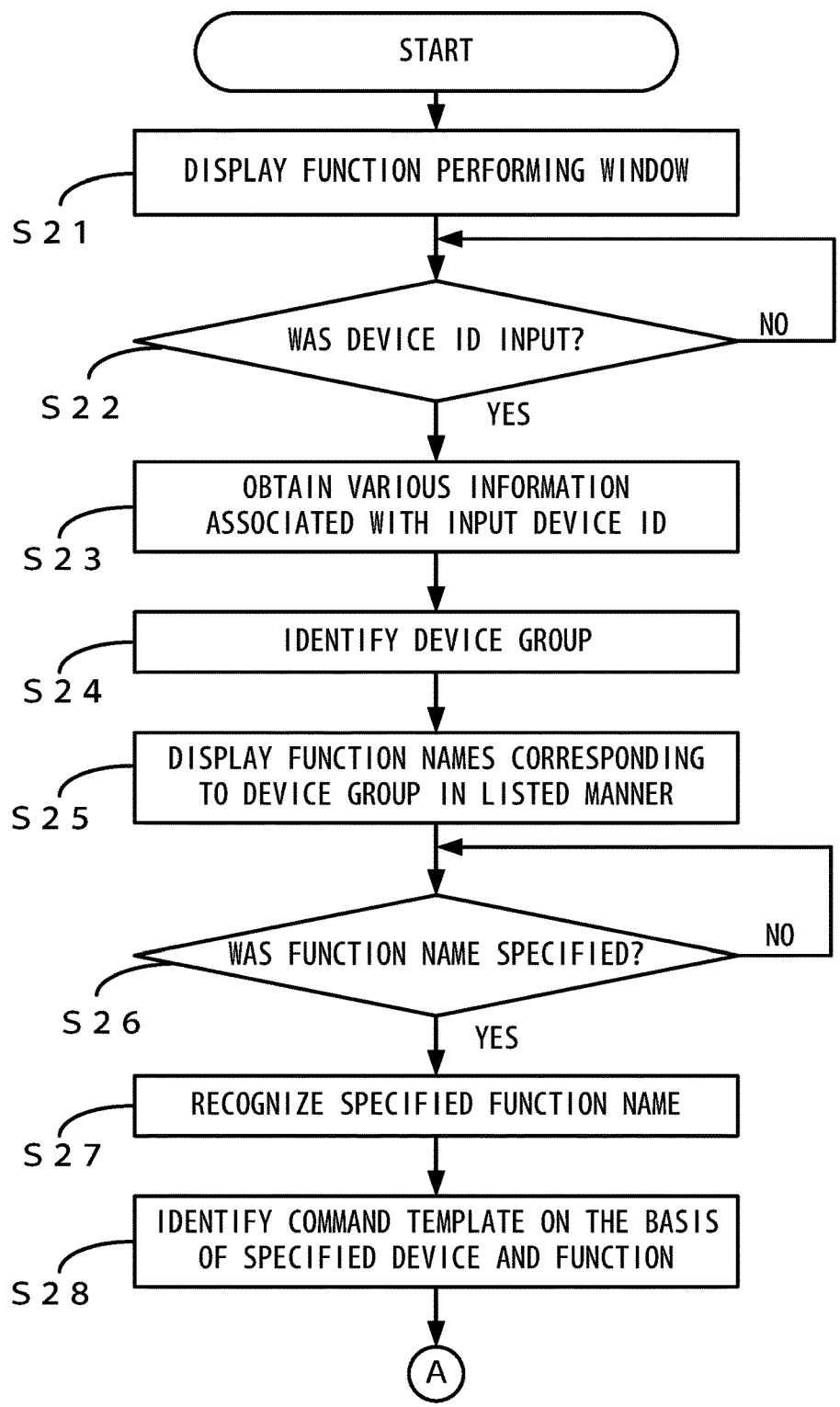
F I G. 19

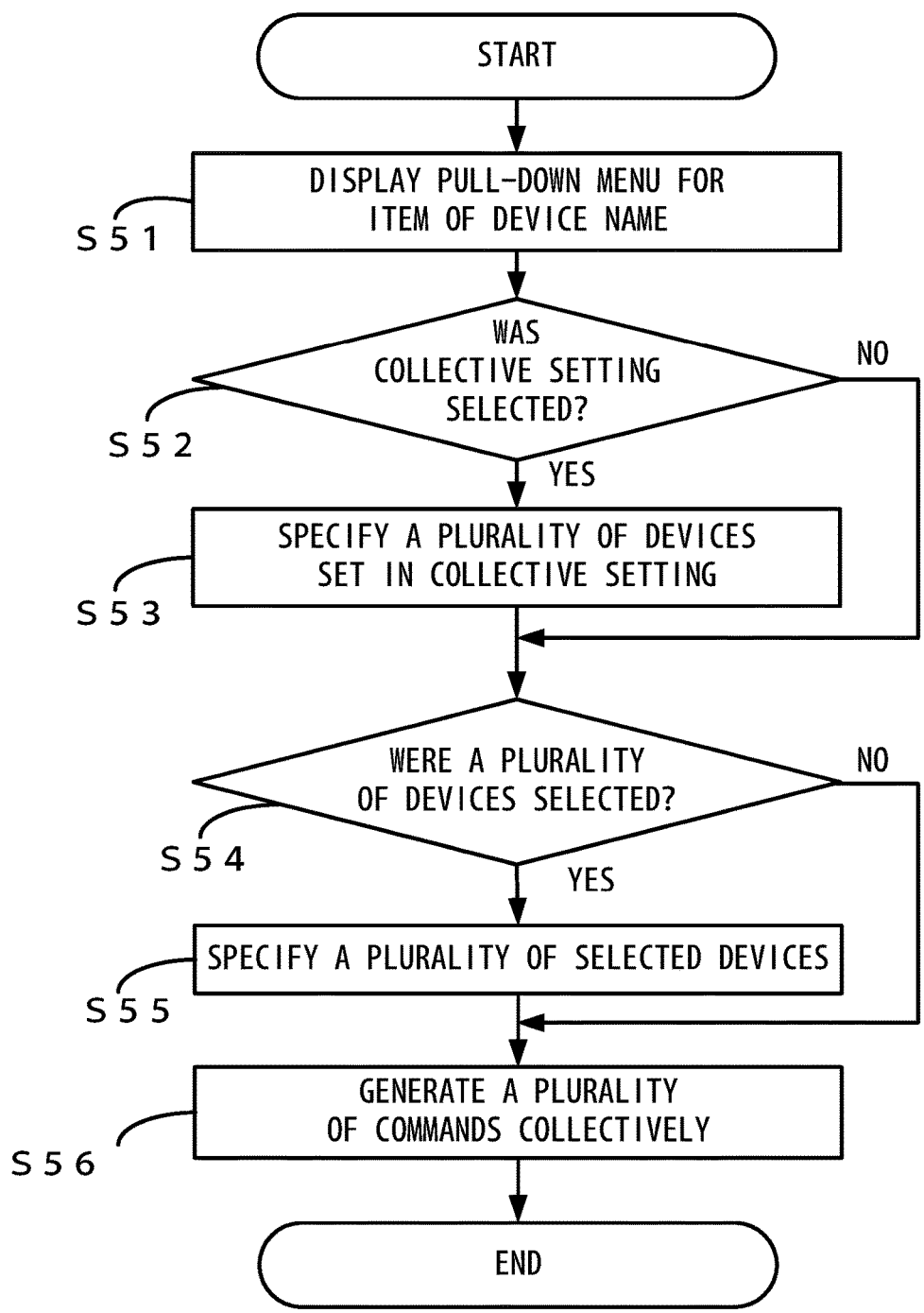
F I G. 23

COMPUTER-READABLE RECORDING MEDIUM, COMMAND GENERATION METHOD AND INFORMATION PROCESSING APPARATUS

CROSS-REFERENCE TO RELATED APPLICATION

This application is based upon and claims the benefit of priority of the prior Japanese Patent Application No. 2015-073068, filed on Mar. 31, 2015, the entire contents of which are incorporated herein by reference.

FIELD

The embodiments discussed herein are related to a computer-readable recording medium, a command generation method and an information processing apparatus.

BACKGROUND

In recent years, a network system operated by a company etc. uses a plurality of network devices. Each network device in a network system is managed by a management device. As an example, a technology called as Software-Defined Networking (SDN) is employed in which a software program executed by a management device manages respective network devices in a centralized manner.

The management device makes network devices perform prescribed functions. For example, the management device makes management-target network devices execute prescribed commands so as to make these network devices perform prescribed functions, and thereby manages them. For this, the management device uses a prescribed template so as to generate a command.

As a related technology, a technology is proposed in which a template for setting structure definitions of network devices is stored in a template storage unit, when a server resource has been added to a network in response to the provision of a new service, a network for which a structure definition is to be added is searched, a structure definition related to the searched network device is read and proposed, and the setting of the network device is modified by using information received from a proposed template (Patent Document 1 for example).

Also, a technology is proposed that suppresses the occurrence of failures caused by operation mistakes upon the command inputs in the operation/maintenance services of a server that provides business processing services to a plurality of customers (Patent Document 2 for example).

Patent Document 1: Japanese Laid-open Patent Publication No. 2007-087268
Patent Document 2: International Publication Pamphlet No. 2007/086129

SUMMARY

According to an aspect of the embodiments, a non-transitory computer-readable recoding medium having stored therein a program for causing a computer to execute a process. The process includes permitting specifying of devices that are made to belong to a device group to which a particular command template for instructing execution of a particular function is applied, over a plurality of types of devices, receiving specifying of a device that is to belong to the device group and specifying of the particular function that the device is made to perform, and generating a command that is applied to a device group to which the specified device belongs and that is used for controlling the specified device on the basis of a particular command template for performing the particular function.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a device table;
FIG. 4 illustrates an example of a function table;
FIG. 5 illustrates an example of a device group table;
FIG. 6 illustrates an example of a command template file;
FIG. 11 illustrates an example of a function performing window (third);
FIG. 13 illustrates examples of a command template file and a command (first);
FIG. 15 illustrates examples of a command template file and a command (second);
FIG. 18 is a flowchart explaining an example of a function table registration process;
FIG. 19 is a flowchart explaining an example of a command execution process (first);
FIG. 23 is a flowchart explaining an example of a process according to the first variation example.

DESCRIPTION OF EMBODIMENTS

A template used by a management device for generating a command is set for each network device and for each function that is performed by a network device. Accordingly, an increase in the number of network devices increases the number of templates for generating templates. Accordingly, in the embodiment, the number of templates used for generating a command is reduced.

<Examples of Network System and Management Device>

Figure 1:
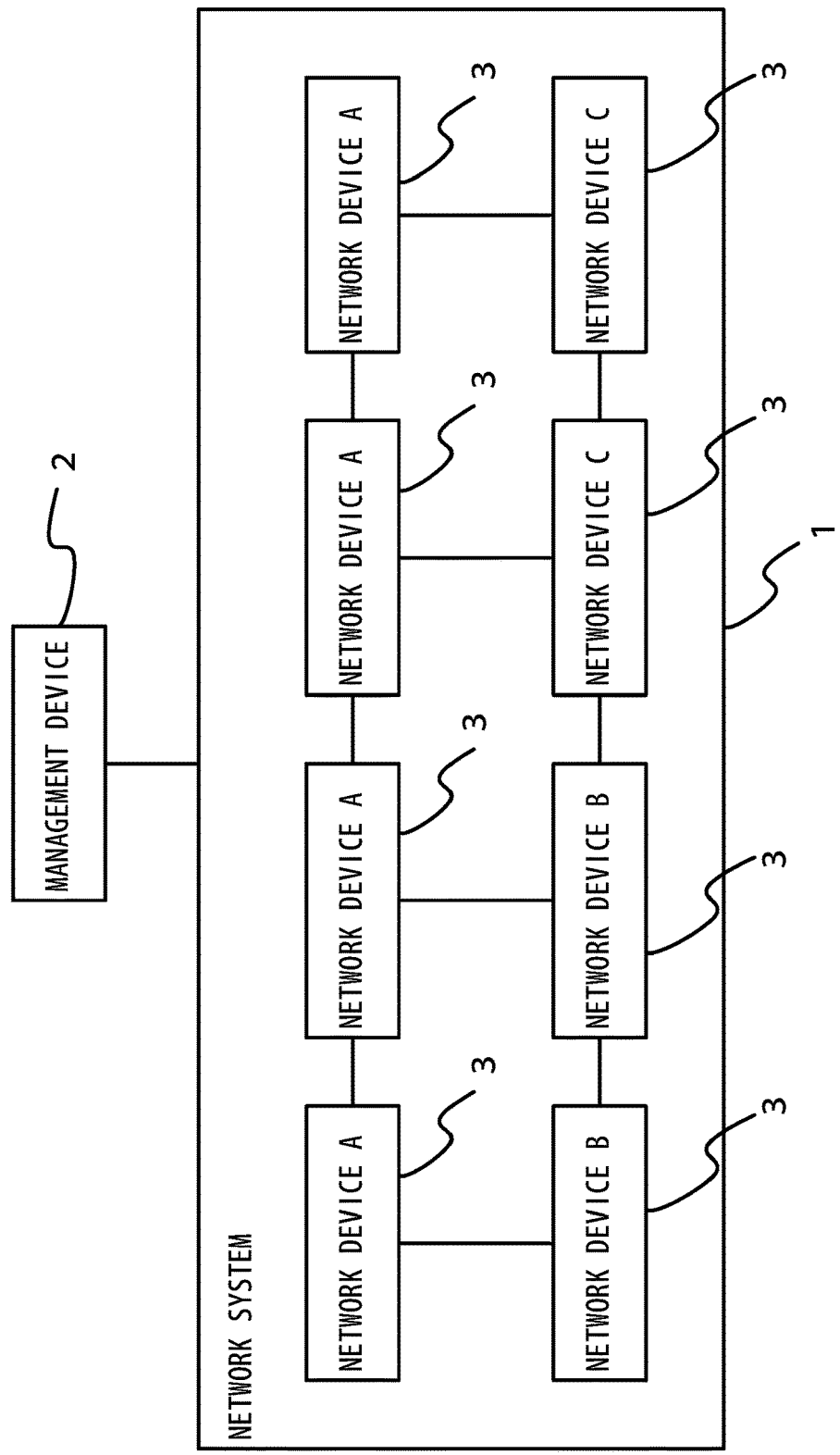
FIG. 1 illustrates examples of a network system and a management device.

By referring to the drawings, the embodiment will be explained. FIG. 1 illustrates examples of a network system 1 and a management device 2. The network system 1 includes a plurality of network devices 3 each of which is connected to at least one of the other network devices 3.

The management device 2 is an information processing apparatus that manages each network device 3 in the network system 1. The information processing apparatus is also referred to as a computer. The management device 2 executes a prescribed command so as to make the network devices 3 perform prescribed functions, and thereby manages the network device 3.

The network devices 3 are various types of devices that control communications. For example, the network devices 3 may be devices such as a Local Area Network (LAN) switch, a router, etc. The network devices 3 may be devices that are not a LAN switch or a router.

FIG. 1 illustrates an example in which the network system 1 includes eight network devices 3. The number of the network devices 3 included in the network system 1 may be an arbitrary number.

Each network device 3 belongs to a device group. In the example illustrated in FIG. 1, four network devices 3 belong to device group A, two network devices 3 belong to device group B, and two network devices 3 belong to device group C.

Hereinafter, the network devices 3 belonging to device group A are referred to as network devices A. The network devices 3 belonging to device group B are referred to as network devices B. The network devices 3 belonging to device group C are referred to as network devices C.

In the example illustrated in FIG. 1, the number of device groups are three, whereas the number of device groups is not limited to three. The number of network devices belonging to a device group is not limited to those numbers in the example illustrated in FIG. 1, either.

Next, a device group will be explained. Each network device 3 belongs to one of the device groups in the network system 1. The management device 2 permits the network devices 3 of different types to belong to the same device group.

There is a case where the network devices 3 of different types are included in the network system 1. When for example the network device 3 has newly been added to the network system 1, the newly-added network device 3 may be of a different type from the type of the existing network devices 3.

As described above, the management device 2 permits the network devices 3 of different types to belong to the same device group. In the embodiment, it is assumed that a device group is associated with a command system of a command to be executed by the network device 3.

The management device 2 permits network devices 3 of different types to belong to the same device when the network devices 3 share the same command system.

Explanations will be given for a command system. A command system represents for example a grammar type (grammar category) of a command. For example, the grammar of a command represents a rule that is applied to the description of the command. Regarding commands of the same system, the same grammar is applied to the description of the contents of the commands.

<Example of Management Device>

Figure 2:
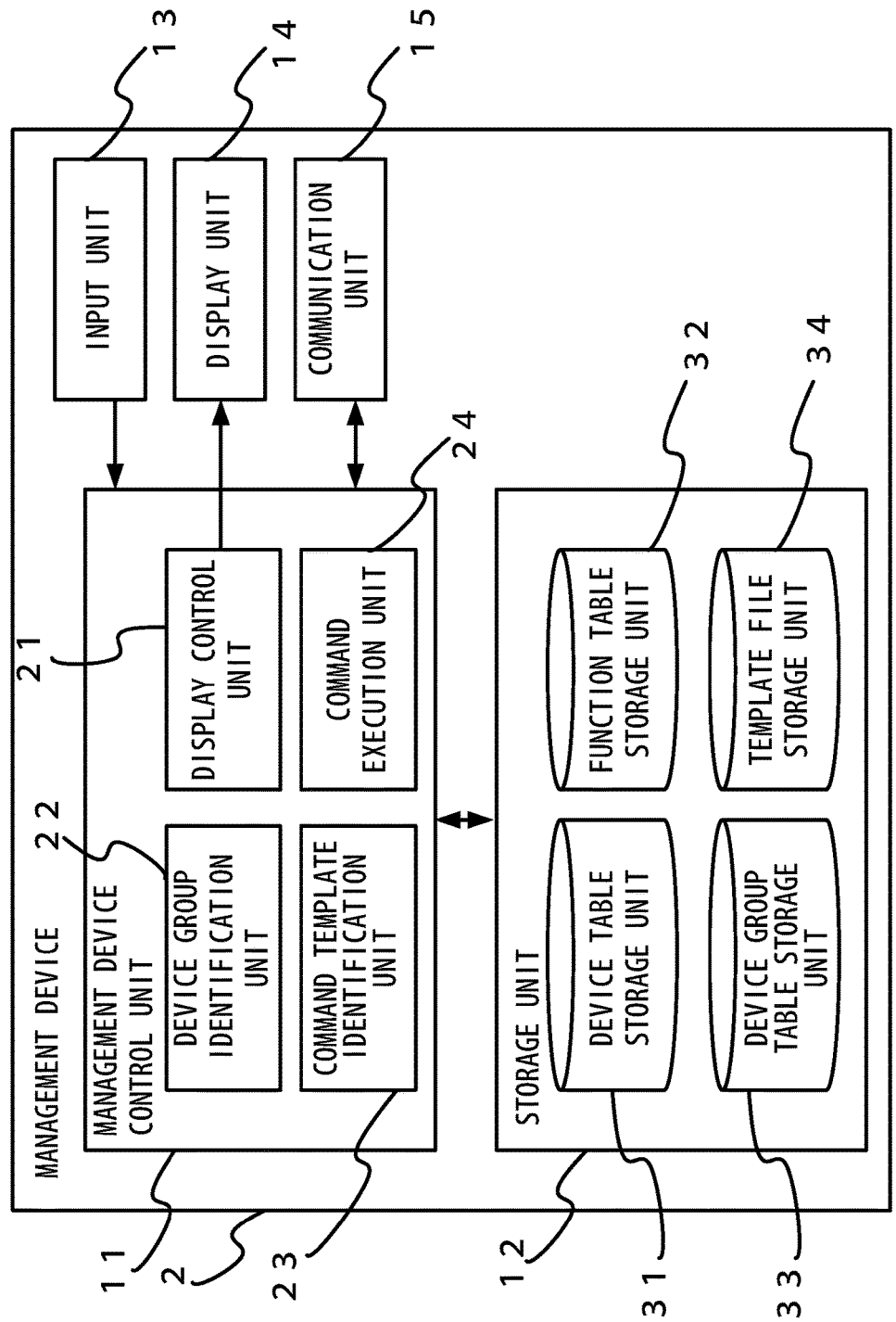
FIG. 2 is a functional block diagram illustrating an example of the management device.

Next, by referring to FIG. 2, explanations will be given for an example of the management device 2. The management device 2 includes a management device control unit 11, a storage unit 12, an input unit 13, a display unit 14 and a communication unit 15. The management device control unit 11 controls the management device 2.

The storage unit 12 stores various types of pieces of information. The storage unit 12 stores for example a table, a data file, etc. The input unit 13 inputs a prescribed piece of information to the management device control unit 11. The input unit 13 may be for example a keyboard, a mouse, etc.

In accordance with the control conducted by the management device control unit 11, the display unit 14 displays a prescribed piece of information. The display unit 14 may be for example a display device. The display unit 14 may have the function of the input unit 13. In such a case, the display unit 14 may be a touch panel display device. The communication unit 15 communicates with the network devices 3 in the network system 1.

The management device control unit 11 includes a display control unit 21, a device group identification unit 22, a command template identification unit 23 and a command execution unit 24. The display control unit 21 conducts control of making the display unit 14 display a prescribed piece of information.

In accordance with device information representing a specified network device 3, the device group identification unit 22 identifies which of the device groups the specified network device 3 belongs to. The device group identification unit 22 is an example of a first identification unit.

On the basis of the function information representing the specified function and the device group identified by the device group identification unit 22, the command template identification unit 23 identifies a command template. The command template identification unit 23 is an example of a second identification unit.

A command template is template data used for generating a command for instructing the network device 3 to execute a particular function. In the embodiment, it is assumed that a command template is defined in data in a command template file.

The command execution unit 24 generates a command so as to make the network device 3 execute the generated command. The command execution unit 24 reflects, in the command template, the value of a parameter (variable parameter) received by the management device control unit 11 so as to generate a command.

The storage unit 12 includes a device table storage unit 31, a function table storage unit 32, a device group table storage unit 33 and a template file storage unit 34. The storage unit 12 may store information other than the above types of pieces of information.

Also, the device table storage unit 31, the function table storage unit 32, the device group table storage unit 33 and the template file storage unit 34 may be assigned to different storage areas in one storage device.

Also, the device table storage unit 31, the function table storage unit 32, the device group table storage unit 33 and the template file storage unit 34 may be stored in different storage devices, respectively. In the embodiment, it is assumed that the storage unit 12 is one storage device.

The device table storage unit 31 stores the correspondence relationship between the network device 3 and the device group to which that network device 3 belongs. Also, the device table storage unit 31 stores information other than the correspondence relationship.

The function table storage unit 32 stores the correspondence relationship between group information for identifying a device group, function information for identifying a function and a command template. It is also assumed that the function table storage unit 32 stores the correspondence relationship between group information, function information and a command template file name.

The device group table storage unit 33 stores a correspondence relationship between group information, the group name of a device group and a storage setting file. Information in the device group table storage unit 33 is set in advance.

The storage setting file is a setting file used by the management device 2 in order to make the network device 3 execute a storage command. It is information for determining whether to reflect a performance result in the network device 3, the performance result being a result of the management device 2 having made the network device 3 perform a prescribed function. In the embodiment, this information is treated as storing-necessity indication information.

When the storage-necessity indication information indicates "necessity" for a command that is to be executed by the network device 3, the command execution unit 24 obtains, from the device group table storage unit 33, the storage setting file corresponding to the device group to which the target network device 3 belongs.

Also, the command execution unit 24 executes a storage command described in the storage setting file. Thereby, the result of the command that the command execution unit 24 made the network device 3 execute is reflected in that network device 3.

The template file storage unit 34 stores a command template file. A command template file also includes information other than a template of a command to be executed by the network device 3. Hereinafter, the template of the command to be executed in the information is referred to as a command template description portion hereinafter.

<Examples of Respective Tables>

FIG. 3 illustrates an example of a device table stored in the device table storage unit 31. The device table illustrated in FIG. 3 includes items for device ID, device name, device group ID, IP address, administrator ID, and administrator password. ID is an abbreviation of identification, and IP is an abbreviation of Internet Protocol.

A device ID is device information for identifying the network device 3. A device name is information representing the name of the network device 3. A device group ID is group information representing the device group to which the network device 3 belongs.

An IP address, an administrator ID and an administrator password are stored corresponding to a device ID. The device table represents the correspondence relationship between a device ID and a device group ID. Thereby, the device table represents which of the device groups the network device 3 belongs.

FIG. 4 illustrates an example of a function table stored in the function table storage unit 32. The function table includes items for device group ID, function name, command template file name. A device group ID is group information representing the device group to which the network device 3 belongs, as described above.

A function name is the name of a function that is to be performed by the network device 3. In the embodiment, by the command execution unit 24 making the network device 3 execute a command, a prescribed function is performed by that network device 3.

FIG. 4 illustrates the Virtual LAN (VLAN) setting function, the communication speed setting function and the VLAN listing function as examples of the functions. For example, the VLAN setting function is a function of setting a VLAN in the network device 3. The functions to be performed by the network device 3 are not limited to the examples illustrated in FIG. 4.

For example, the communication speed setting function may be a function of setting a communication speed in the network device 3. Also, for example, the VLAN listing function may be a function of obtaining a list of VLANs set in the network device 3.

FIG. 5 illustrates an example of a device group table stored in the device group table storage unit 33. The device group table includes items for device group ID, device group name and storage setting file name. A storage setting file name is the name of the above storage setting file.

<Example of Command Template File>

FIG. 6 illustrates an example of a command template file. The file name of the command template file illustrated as an example in FIG. 6 is "func001.conf". A command template file includes a command template description portion (the portion enclosed by the dashed line in FIG. 6).

In the command template description portion in the command template file illustrated as an example in FIG. 6, symbols "%" indicate that the portions between such symbols are parameters. When the values for the parameters in the command template description portion have been specified, the command execution unit 24 generates a command in which the specified parameters are reflected.

When for example "7" is specified for the interface number and "10" is specified for the VLAN ID, the command execution unit 24 generates a command including "switch port 7" and "vlan tag 10".

The command template file illustrated in the example in FIG. 6 also includes information other than a command template description portion. A command template file is an example of a command template. In some cases, a command template file does not include information other than a command description portion.

A function name is the name of a function. In the example illustrated in FIG. 6, the function name is VLAN setting function. Accordingly, the command template file of the example illustrated in FIG. 6 is a command template for generating a command that makes the network device 3 performs the VLAN setting function.

A target device group identifies a device group. In the example illustrated in FIG. 6, the target device group is "Gr-A". To the network devices 3 that belong to this device group "Gr-A", command templates of the same command system are applied.

Execution permission authority is information representing the authority to execute a command. In the example illustrated in FIG. 6, it is illustrated that the execution permission authority of the command template file is given to the administrator and general users. In such a case, the management device control unit 11 permits the administrator and general users to make the network device 3 execute the command.

When the execution permission authority does not include the description of "general users" in the command template file, the management device control unit 11 does not permit general users to make the network device 3 execute the command.

Parameter definition is a definition of a parameter in the command template description portion. In the example illustrated in FIG. 6, when the parameter name is an interface number, it is indicated that parameters that can be specified are numeric values that are 1 or greater and 256 or smaller.

Also, when the parameter name is VLAN ID in the example illustrated in FIG. 6, it is indicted that the parameters that are permitted to be specified are numeric values that are 1 or greater and 4095 or smaller. Command template files are not limited to the example illustrated in FIG. 6.

A command template file is stored in the template file storage unit 34. For example, the management device 2 may store, in the template file storage unit 34 in advance, data obtained by editing the contents of a command template file.

<Example of Various Widows>

Figure 7:
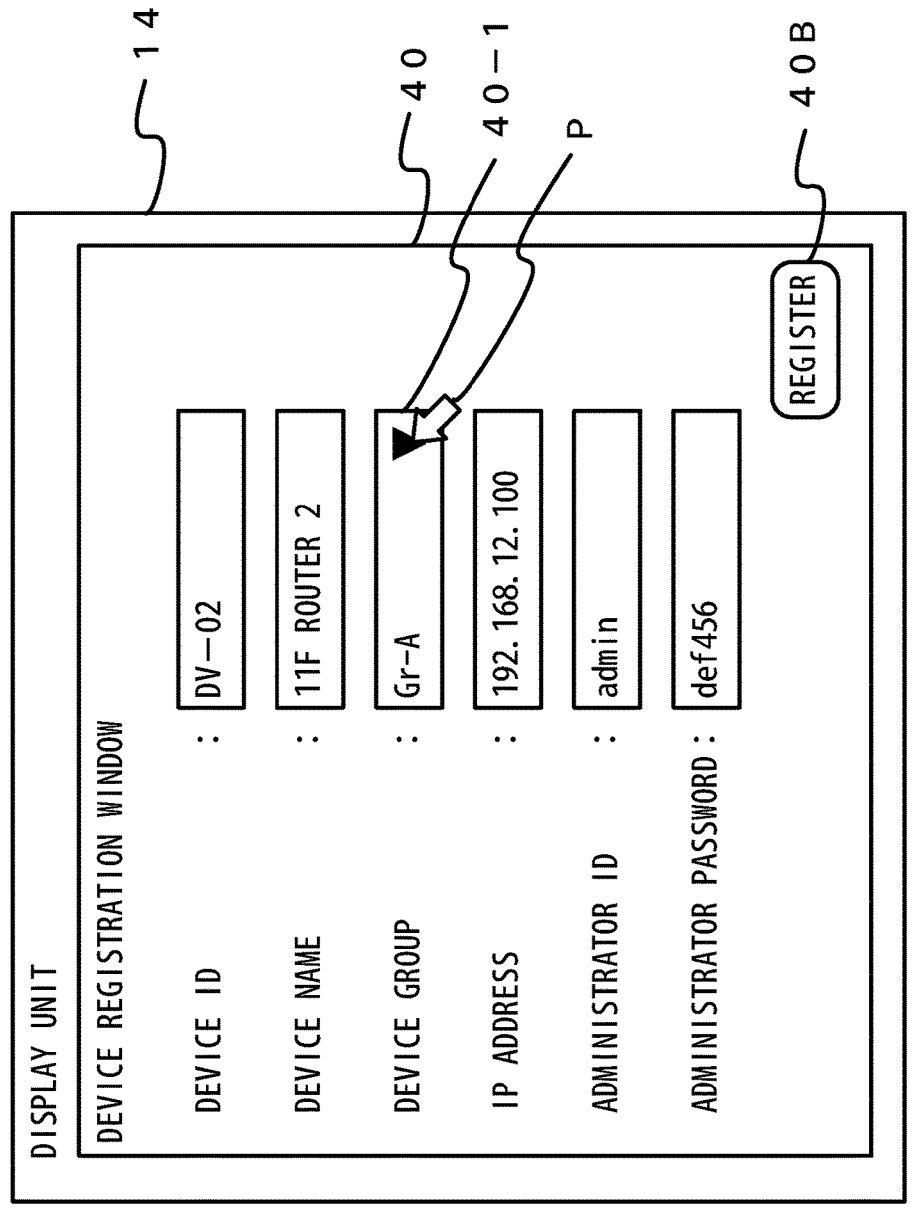
FIG. 7 illustrates an example of a device registration window.

Next, explanations will be given for various window examples displayed in the display unit 14. FIG. 7 illustrates an example of a device registration window 40 displayed in the display unit 14. The device registration window 40 is a window for adding a new network device 3.

The device registration window 40 has items for device ID, device name, device group, IP address, administrator ID and administrator password. For each item, a value can be input.

For example, the administrator of the network system 1 uses the input unit 13 to input, for each item, information regarding the network device 3 to be registered. Hereinafter, it is assumed that the input unit 13 is a mouse or a keyboard.

For example, the administrator manipulates the mouse or the keyboard so as to input, for each item, information regarding the network device 3. In the example illustrated in FIG. 7, a character string of "DV-02" has been input for the item of device ID.

Also, a character string of "11F router 2" has been input for the item of device name. In the embodiment, it is assumed that a device group is selected from a pull-down menu for a device group item 40-1.

The administrator manipulates the mouse so as to push a symbol displayed in the device group item 40-1 (the black triangle in FIG. 7). In FIG. 7, P denotes the mouse pointer.

Receiving the manipulation in which the mouse pushed the symbol, the management device control unit 11 refers to the device group table in the device group table storage unit 33. A device group ID has been stored in the device group table in advance.

The display control unit 21 displays the respective device group IDs in the device group table in a listed manner. In the example illustrated in FIG. 5, the administrator has used the mouse to select "Gr-A", which is a device group ID, from among the respective device group IDs displayed in a listed manner.

Thereby, the management device control unit 11 recognizes that "Gr-A" has been specified. The display control unit 21 displays specified "Gr-A" for the item of device group in the display unit 14.

The administrator may also use the keyboard to input the character string of "Gr-A" for the device group item 40-1. In such a case, the management device control unit 11 receives the input from the keyboard so as to recognize the character string of "Gr-A".

The administrator uses the mouse and the keyboard so as to input information of the respective items for IP address, administrator ID and administrator password. When the administrator pushed a registration button 40B by using the mouse, the management device control unit 11 recognizes the pieces of information input to the respective items.

Then, the management device control unit 11 stores, in the device table storage unit 31, the pieces of information input for the respective items. Thereby, the network device 3 is newly registered in the device table of the device table storage unit 31.

Figure 8:
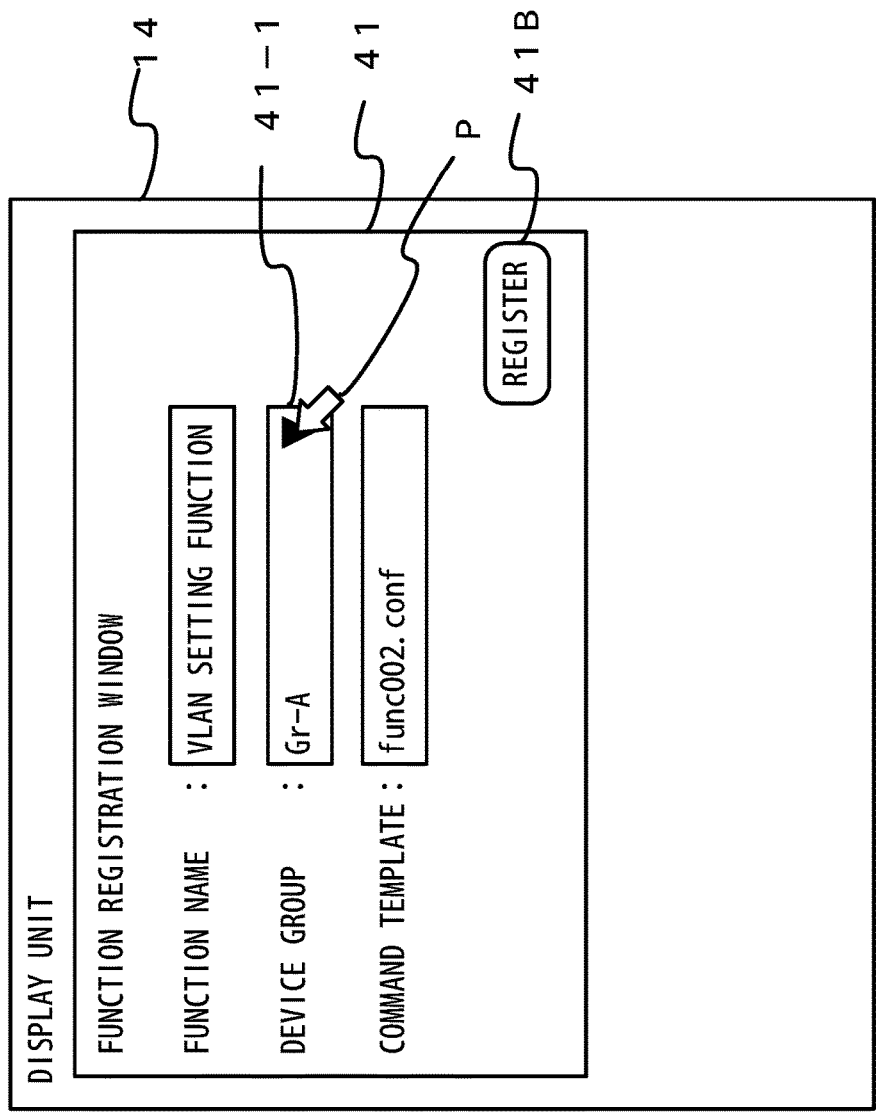
FIG. 8 illustrates an example of a function registration window.

Next, a function registration window 41 will be explained. FIG. 8 illustrates an example of the function registration window 41. The function registration window 41 includes three items for function name, device group and command template.

The administrator uses the keyboard so as to input the function name for the item of function name. In the example illustrated in FIG. 8, "VLAN setting function" has been input as the function name. The management device control unit 11 receives the input of the function name.

The administrator uses the mouse so as to push a symbol displayed in a device group item 41-1 (black triangle in FIG. 8). The management device control unit 11 receives the mouse manipulation.

The management device control unit 11 refers to the device group table in the device group table storage unit 33. As described above, a device group ID is stored in the device group table in advance.

The display control unit 21 displays the respective device group IDs in the device group table in a listed manner. The administrator uses the mouse so as to select one device group ID from among the respective device group ID displayed in a listed manner. In the case of the example illustrated in FIG. 8, the administrator has selected "Gr-A" as the device group ID.

Thereby, the management device control unit 11 recognizes that "Gr-A" has been specified. The display control unit 21 displays the specified "Gr-A" in the item of device group in the display unit 14. Note that the administrator may input the character string of "Gr-A" for the item of device group.

The administrator uses the keyboard so as to input the command template file name to be registered, for the item of command template. When the administrator pushes a registration button 41B, the management device control unit 11 recognizes the function name, the device group ID and the command template file name.

Management device control unit 11 registers, in the function table of the function table storage unit 32, the recognized function name, device group ID and command template file name. Thereby, a new function is added to the function table.

Figure 9:
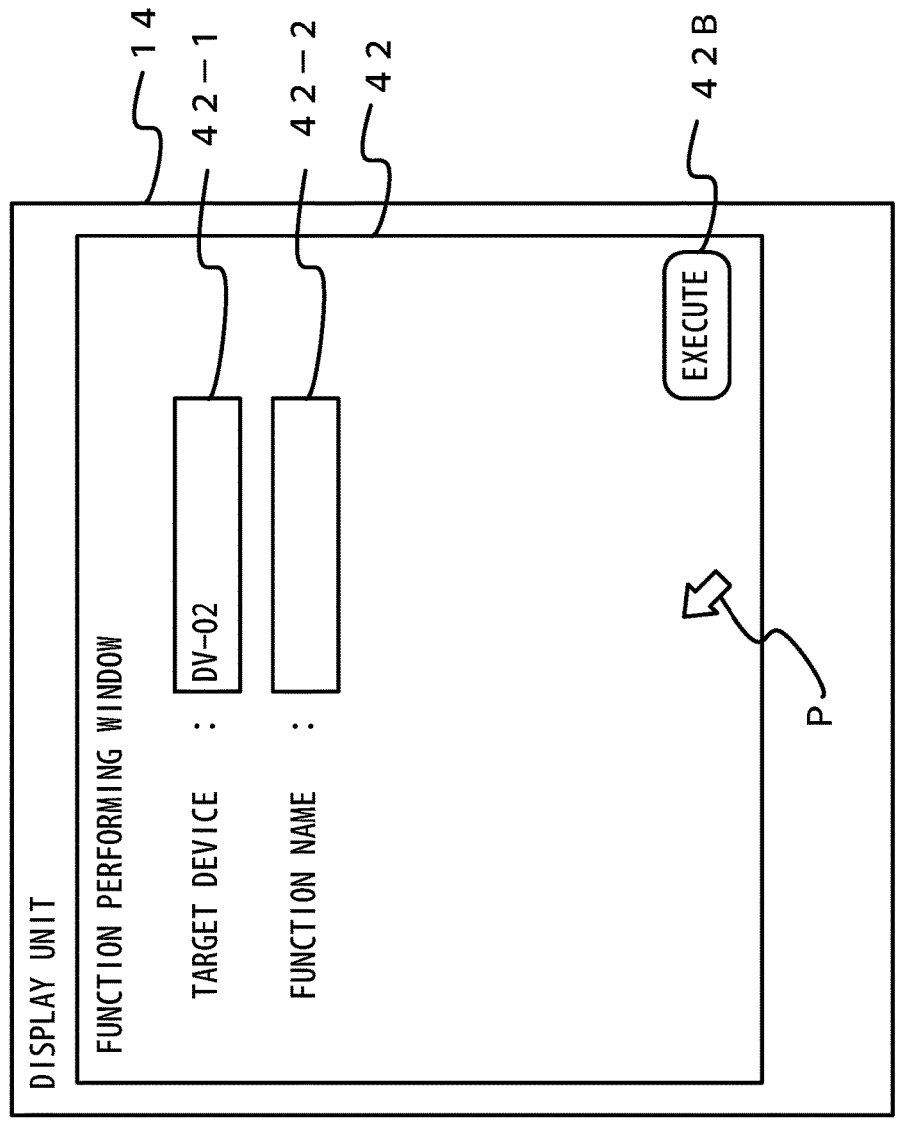
FIG. 9 illustrates an example of a function performing window (first)

Next, explanations will be given for a function performing window 42. FIG. 9 illustrates an example of the function performing window 42. The function performing window 42 is a window that generates a command and makes the network device 3 execute the generated command in order to make the network device 3 perform a prescribed function.

The function performing window 42 includes a target-device item 42-1 and a function name item 42-2. The target-device item 42-1 is an example of the first item. Also, the function name item 42-2 is an example of the second item.

The administrator uses the keyboard so as to input, to the target-device item 42-1, the device ID that identifies the network device 3 that is to be made to perform a function. In the example illustrated in FIG. 9, the device ID of "DV-02" has been input.

The management device control unit 11 recognizes the information of the input device ID. The device group identification unit 22 recognizes that the device ID of the target device to be made to perform the function is "DV-02".

In the example illustrated in FIG. 9, no information has been input for the function name item 42-2.

The device group identification unit 22 obtains "Gr-A", which is the device group ID corresponding to the recognized device ID "DV-02", from the device table stored in the device table storage unit 31. Thereby, the device group identification unit 22 identifies the device group ID to which the device ID "DV-02" belongs.

Next, the command template identification unit 23 obtains the function name corresponding to the device group ID "Gr-A" identified by the device group identification unit 22 from the function table stored in the function table storage unit 32. In the function table, "VLAN setting function", "communication speed setting function" and "VLAN listing function" are associated with device group ID "Gr-A".

Figure 10:
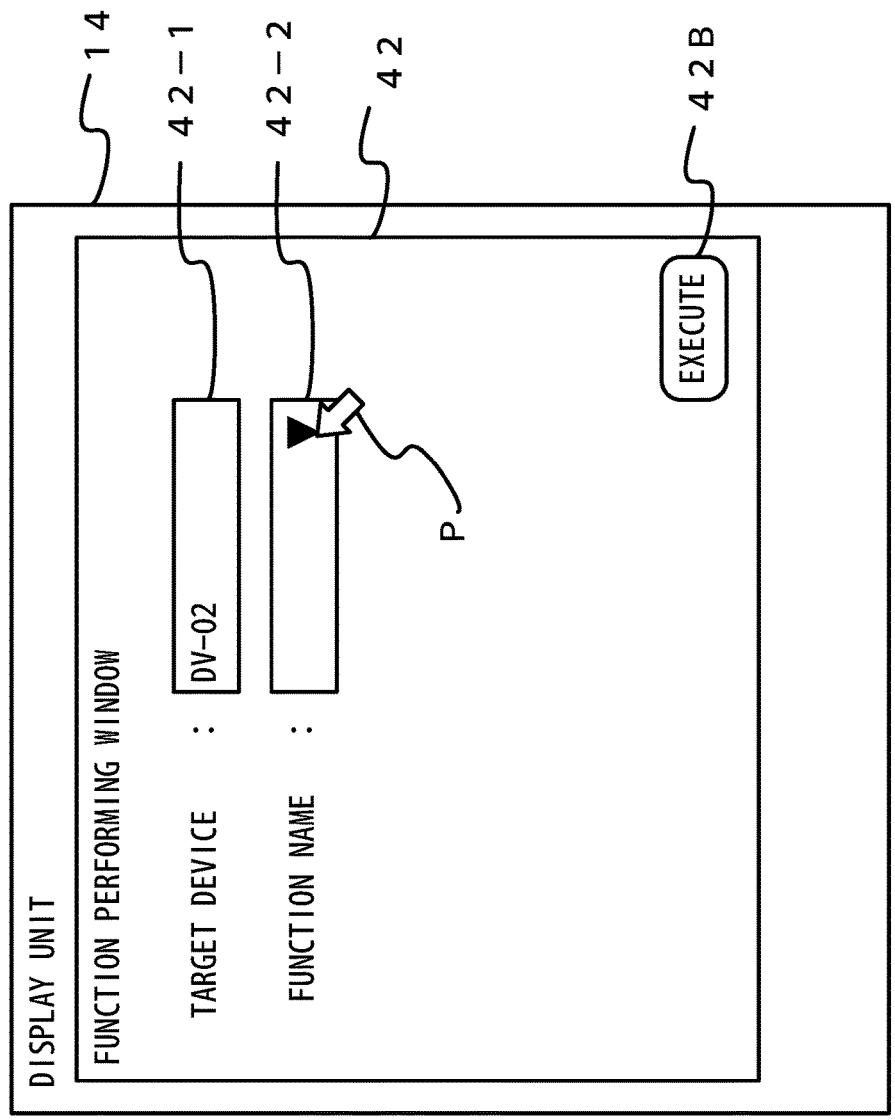
FIG. 10 illustrates an example of a function performing window (second)

The command template identification unit 23 obtains the above three function names corresponding to device group ID "Gr-A". As illustrated in the example of FIG. 10, the display control unit 21 conducts control of displaying, in the function name item 42-2, the symbol for displaying the pull-down menu (the black triangle in FIG. 10).

The administrator uses the mouse so as to push the symbol displayed in the function name item 42-2. When the management device control unit 11 receives the mouse manipulation, the display control unit 21 displays the above three function names obtained from the function table, in the display unit 14 in a listed manner.

FIG. 11 illustrates an example of the function performing window 42 in which the above three function names are listed. The administrator uses the mouse so as to select one of the three function names. In the example illustrated in FIG. 11, the administrator has selected VLAN setting function. In FIG. 11, a selected function name is hatched. Thereby, the management device control unit 11 recognizes that the VLAN setting function has been selected.

Thereby, the command template identification unit 23 recognizes that the VLAN setting function has been specified as the function that is to be performed by the network device 3 with device ID "DV-02".

Accordingly, the command template identification unit 23 recognizes the network device 3 that is to be made to perform the function and the function to be performed. In the case of the example illustrated in FIG. 11, the command template identification unit 23 recognizes that the specified function is "VLAN setting function" and the specified network device 3 is the device ID of "DV-02".

As described above, the device group identification unit 22 obtains the device group ID from the device table storage unit 31 on the basis of the device ID input for the target-device item 42-1. Also, the command template identification unit 23 obtains the function name from the function table storage unit 32 on the basis of the obtained device group ID.

In the function table, function names and command template filenames are associated. The command template files with the command template file names associated with the respective function names displayed in the function performing window 42 in a listed manner are stored in the template file storage unit 34. Accordingly, it is possible for the display control unit 21 to display only the functions that are associated with the command template files in the function performing window 42 in a listed manner.

The administrator selects the function name of the performing target from the displayed list. When the management device control unit 11 receives the selection manipulation, the display control unit 21 conducts control of displaying, in the function performing window 42, parameter display region R1, which is illustrated as an example in FIG. 12.

The management device control unit 11 obtains, from the device table stored in the device table storage unit 31, the device group ID corresponding to the device ID specified in the function performing window 42.

Then, the command template identification unit 23 obtains, from the function table stored in the function table storage unit 32, the command template file name corresponding to the obtained device group ID and the function name specified in the function performing window 42. Thereby, the command template identification unit 23 identifies the command template file name, i.e., the command template file.

Figure 12:
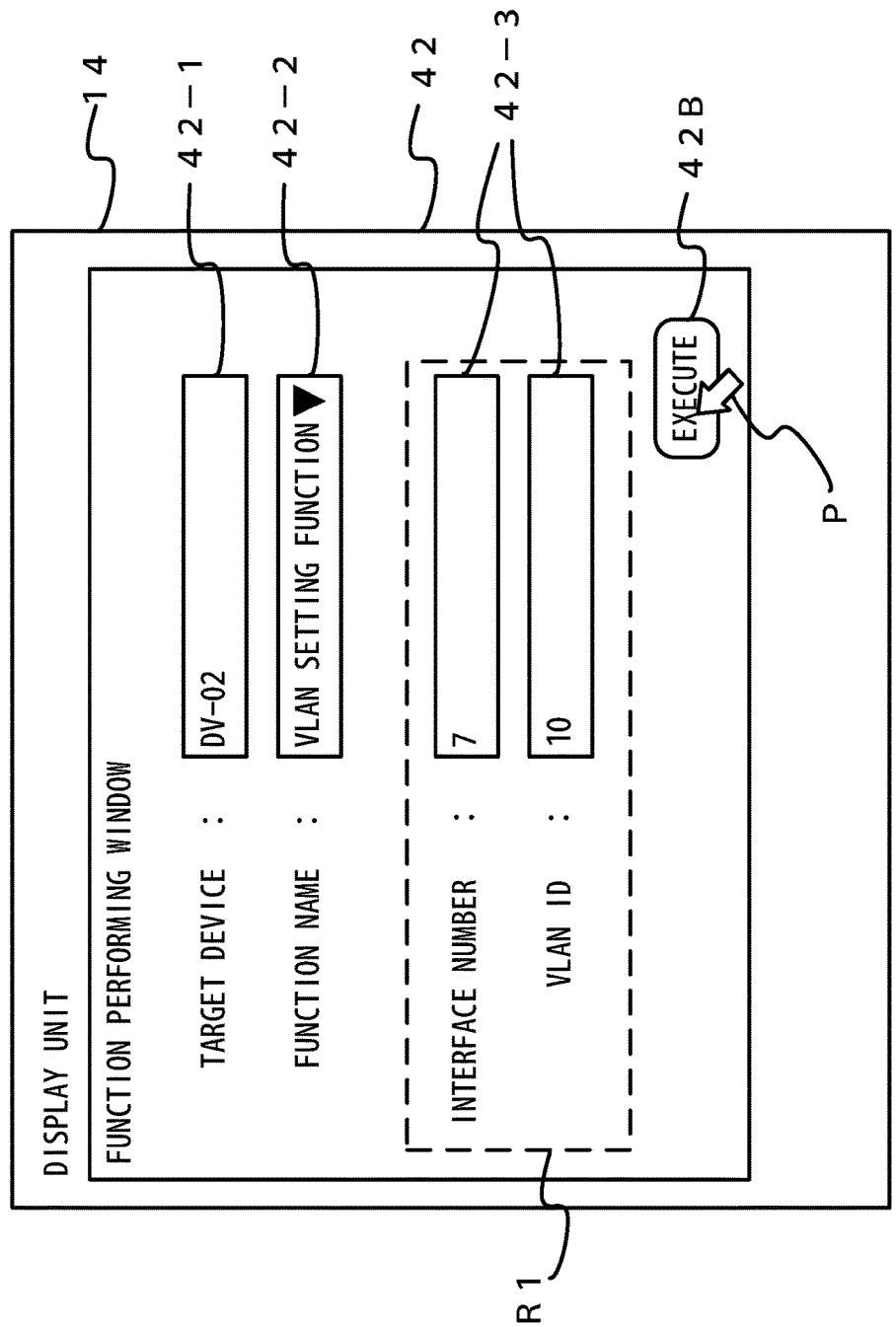
FIG. 12 illustrates an example of a function performing window (fourth)

In the example illustrated in FIG. 12 for example, device ID "DV-02" and function name "VLAN setting function" have been specified. In the function table, command template file name "func001.conf" has been associated with "DV-02" and "VLAN setting function".

The parameters described in the command template description portion of command template file name "func001.conf" are "interface number" and "VLAN ID". The command template identification unit 23 obtains the command template file with command template file name "func001.conf" from the template file storage unit 34. Then, the management device control unit 11 recognizes the above two parameters.

The display control unit 21 displays, in the parameter display region R1, the items to which values are input for the parameters corresponding to the specified device ID and function name. In the case of the example illustrated in FIG. 12, the display control unit 21 conducts control of displaying, in the parameter display region R1, the two items 42-3 for "interface number" and "VLAN ID". At least one item 42-3 included in the parameter display region R1 is an example of the third item.

The management device control unit 11 receives inputs of values to the parameter display region R1. In the example illustrated in FIG. 12, the administrator has input "7" for the item of the interface number among the two items in the parameter display region R1. Also, the administrator has input "10" for the item of the VLAN ID.

When the administrator pushes an execution button 42B, the management device control unit 11 receives this pushing manipulation, and recognizes the values input to the respective items. Thereby, the management device control unit 11 recognizes that the interface number is "7" and the VLAN ID is "10".

The command execution unit 24 reflects the input parameter values in the command template file so as to generate a command. In the example illustrated in FIG. 13, the command execution unit 24 has reflected "7" in the parameter of the interface number and has reflected "10" in the parameter of "VLAN ID".

Thereby, the command execution unit 24 generates a command including "switch port 7" and "vlan tag 10" as illustrated in the example of FIG. 13 on the basis of the command template and the input parameter values. In the function performing window 42, the device ID of the device that is to execute the command has been specified.

The command execution unit 24 makes the network device 3 with the specified device ID execute the generated command. In the example illustrated in FIG. 12 and FIG. 13, the command execution unit 24 makes the network device 3 with device ID "DV-02" execute the above command.

Thereby, the management device 2 makes the network device 3 with device ID "DV-02" perform the VLAN setting function. Accordingly, the management device 2 makes the network device 3 execute the command generated by the command execution unit 24, and thereby makes the network device 3 perform a prescribed function.

Figure 14:
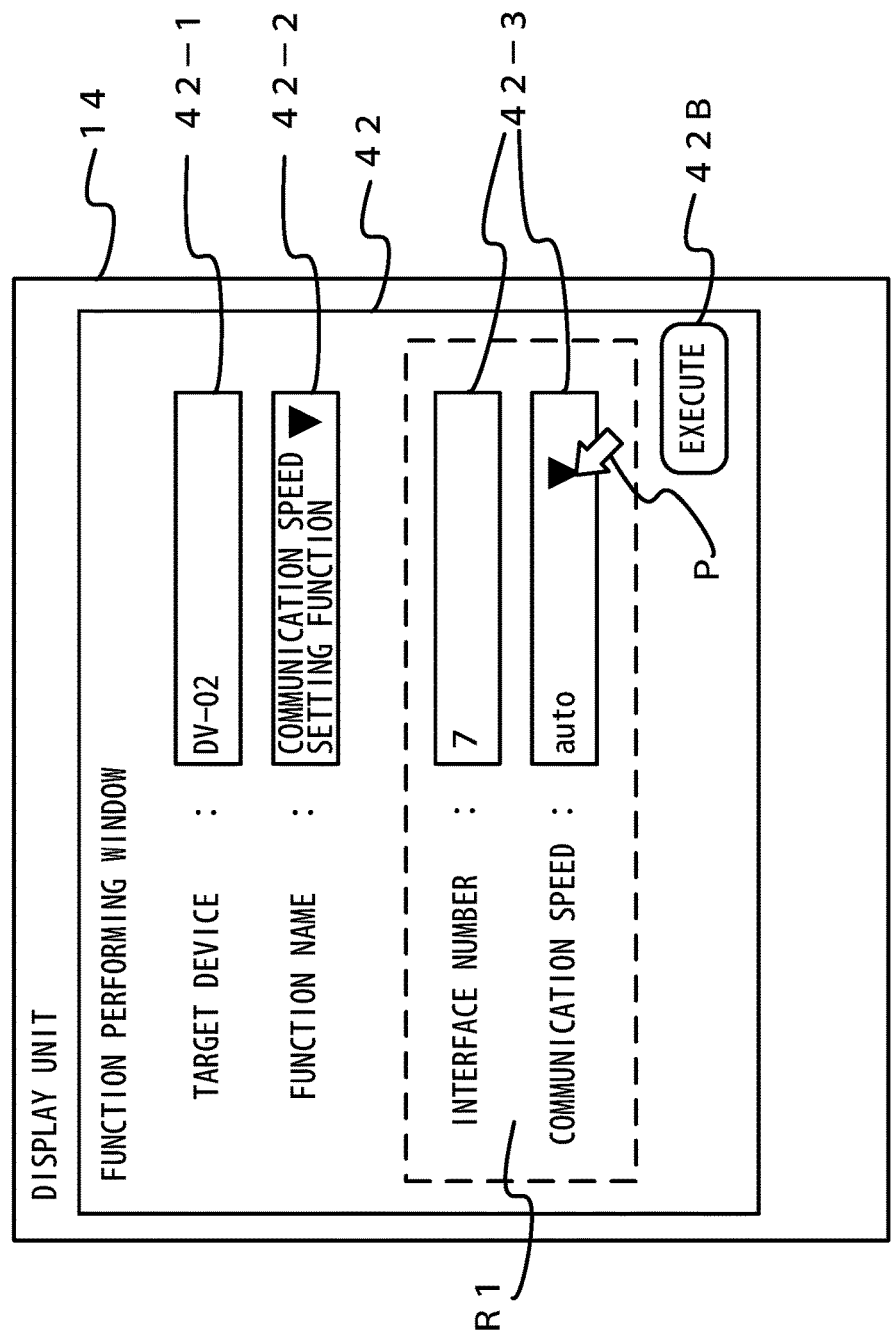
FIG. 14 illustrates an example of a function performing window (fifth)

The display control unit 21 displays, in the parameter display region R1, items for which values are to be input regarding the parameters corresponding to the specified device ID and function name. FIG. 14 illustrates an example of the function performing window 42 in which the specified function name is "communication speed setting function".

Because the specified function name is "communication speed setting function", the display control unit 21 displays, in the function performing window 42, the parameter display region R1 corresponding to the communication speed setting function. In the example illustrated in FIG. 12, because the specified function name is "VLAN setting function", the display control unit 21 displays "interface number" and "VLAN ID" in the parameter display region R1.

In the example illustrated in FIG. 14, because the specified function name is "communication speed setting function", the display control unit 21 displays "interface number" and "communication speed" in the parameter display region R1. Accordingly, the examples illustrated in FIG. 12 and FIG. 14 have different specified function names, and accordingly these examples displays different parameter items in the parameter display region R1.

In the embodiment, the parameter of the communication speed has the attributes of "auto", "100" and "10". The display control unit 21 displays, in the item of communication speed, the symbol for displaying the three attributes in a listed manner in a pull-down menu in the item of specifying the parameter of a communication speed.

The administrator uses the mouse so as to push the symbol and select one of the three attributes displayed in a listed manner. In the example illustrated in FIG. 14, the administrator has selected "auto" as the value of the parameter of a communication speed. Then, the administrator pushes the execution button 42B.

Receiving the above manipulation, the management device control unit 11 reflects the value of the specified parameter in the command template description portion of the command template file, and generates a command. In the example illustrated in FIG. 15, "7" has been specified as the interface number while "auto" has been specified as the parameter of a communication speed, causing the command execution unit 24 to generate a command including "switch port 7" and "mode auto".

The makes the network device 3 with the specified device ID execute the generated command. In the case illustrated in FIG. 14 and FIG. 15, the command execution unit 24 makes the network device 3 with device ID "DV-02" execute the above command.

Thereby, the management device 2 makes the network device 3 with device ID "DV-02" perform the communication speed setting function. Accordingly, the management device 2 makes the network device 3 execute the command generated by the command execution unit 24, and thereby makes the network device 3 perform a prescribed function.

Next, by referring to the example illustrated in FIG. 16, explanations will be given for display control based on input values of parameters. It is assumed that "DV-02" has been specified as device ID and "VLAN setting function" has been specified as function name, in the function performing window 42 as illustrated in the example of FIG. 16.

Figure 16:
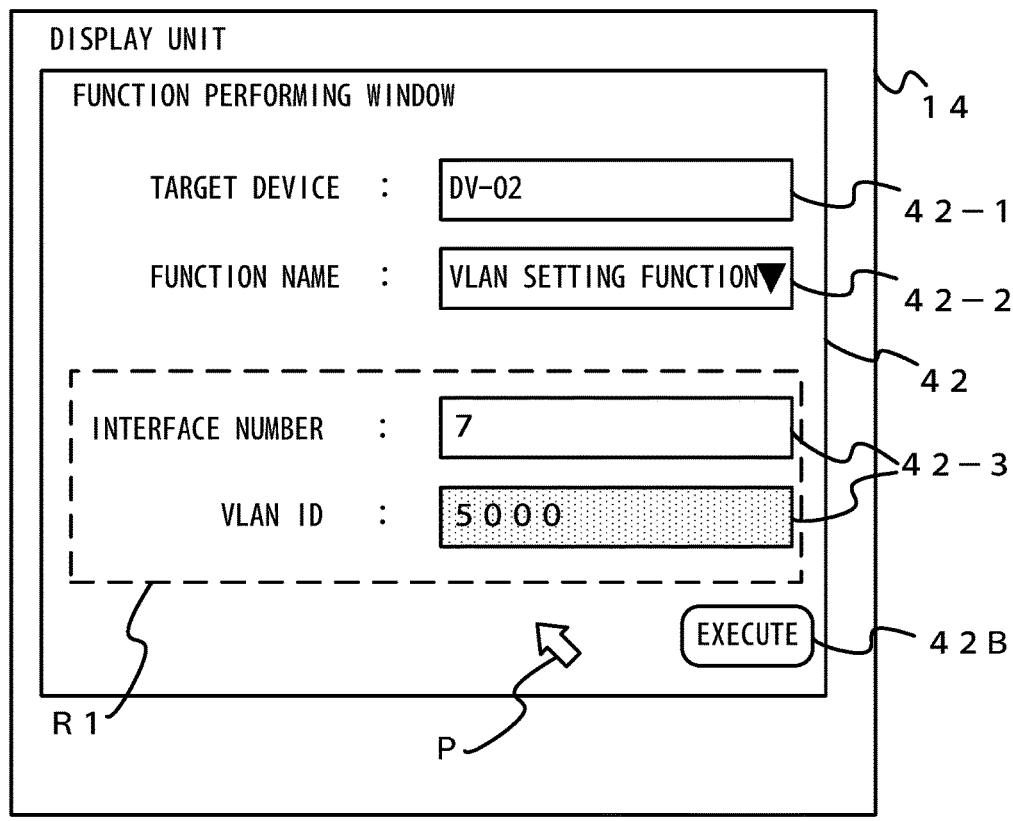
FIG. 16 illustrates examples of a function performing window and a command template file.

It is also assumed that the command template file associated with device ID "DV-02" and function name "VLAN setting function" is the command template file illustrated in the example of FIG. 16. The parameters in the command template file in the example of FIG. 16 include input conditions. Note that the command template file in the example of FIG. 16 include other types of pieces of information.

The parameter of "switch port" includes the input condition of "numeric value: 1 or greater and 256 or smaller" in addition to the input condition of "interface number". This case illustrates that the value that can be specified as the interface number is a numeric value that is 1 or greater and 256 or smaller.

The parameter of "vlan tag" includes the input condition of "numeric value: 1 or greater and 4095 or smaller" in addition to the input condition of "VLAN ID". This case illustrates that the value that can be specified as the VLAN ID is a numeric value that is 1 or greater and 4095 or smaller.

The management device control unit 11 recognizes an input condition included in the command template. The management device control unit 11 checks whether the value input for each item in the parameter display region R1 satisfies the input condition.

It is assumed for example that the administrator has input the value of "5000" as the VLAN ID as illustrated in the example of FIG. 16. The management device control unit 11 recognizes the value input for the item of VLAN ID, and checks whether the input value satisfies the input condition.

The input condition for VLAN ID is a numeric value that is 1 or greater and 4095 or smaller. Accordingly, the input value "5000" does not satisfy the input condition for VLAN ID. In such a case, the display control unit 21 gives a prescribed warning in the display unit 14.

In the example illustrated in FIG. 16, the display control unit 21 changes the background color of the item of VLAN ID. In FIG. 16, the change in the background color is indicted by hatching. Thereby, the display unit 14 indicates that the value input as the parameter of VLAN ID does not satisfy the input condition.

For example, when a value input to an item in the parameter display region R1 satisfies the input condition, the display control unit 21 may conduct control of displaying the background of that item in a green color, and when such a value does not satisfy the input condition, the display control unit 21 may conduct control of displaying the background of that item in a red color.

In such a case, an item with the red background indicates that the value does not satisfy the input condition. Warning display may also be implemented in a manner that is not a changed background color. For example, when a value input for the item in the parameter display region R1 does not satisfy the input condition, the display control unit 21 may display, in the display unit 14, a warning indicating that the value does not satisfy the input condition.

As described above, command template files are associated with device group IDs. In the embodiment, device groups are associated with a command template file that defines command templates of the same command system.

As described above, when the network device 3 has newly been added to the network system 1, the network system 1 includes the existing network devices 3 and the new network device 3. Also, there is a case where the network system 1 is constructed by using a plurality of network devices 3 of different types.

The management device 2 permits the network devices 3 of different types to belong to a device group to which a command template is applied. Accordingly, the management device 2 applies a common command template to the respective network devices 3 belonging to the same device group, and thereby generates a command.

Accordingly, compared with a case where a command template is set for each network device 3, a smaller number of command templates are to be set. Compared also with a case where a command template is set for each type of the network devices 3, a smaller number of command templates are to be set.

In the above embodiment, a command system and a device group are in a one-to-one relationship, while a plurality of command templates may be associated with one command system. In such a case, a plurality of device groups are associated with one command system.

For example, there is a case where the management device 2 outputs a command specifying an option and a command not specifying an option regarding commands of the same command system. An example of an option is an operand.

In this case, the management device 2 can output both a command to which an operand has been added and a command to which an operand has not been added. A command to which an operand has been added and a command to which an operand has not been added belong to the same command system. The management device 2 applies different command templates of the same command system to these commands, respectively.

Accordingly, the management device 2 can customize the types of commands flexibly by permitting not only one command template but also a plurality of command templates to be applied to commands of the same command system.

Also in this case, the management device 2 permits a plurality of types of devices to belong to a device group associated with a command template. Accordingly, because a common command template is applied to commands output to different types of the network devices 3, making it possible to reduce the number of command templates that are set.

<Various Flowcharts>

Figure 17:
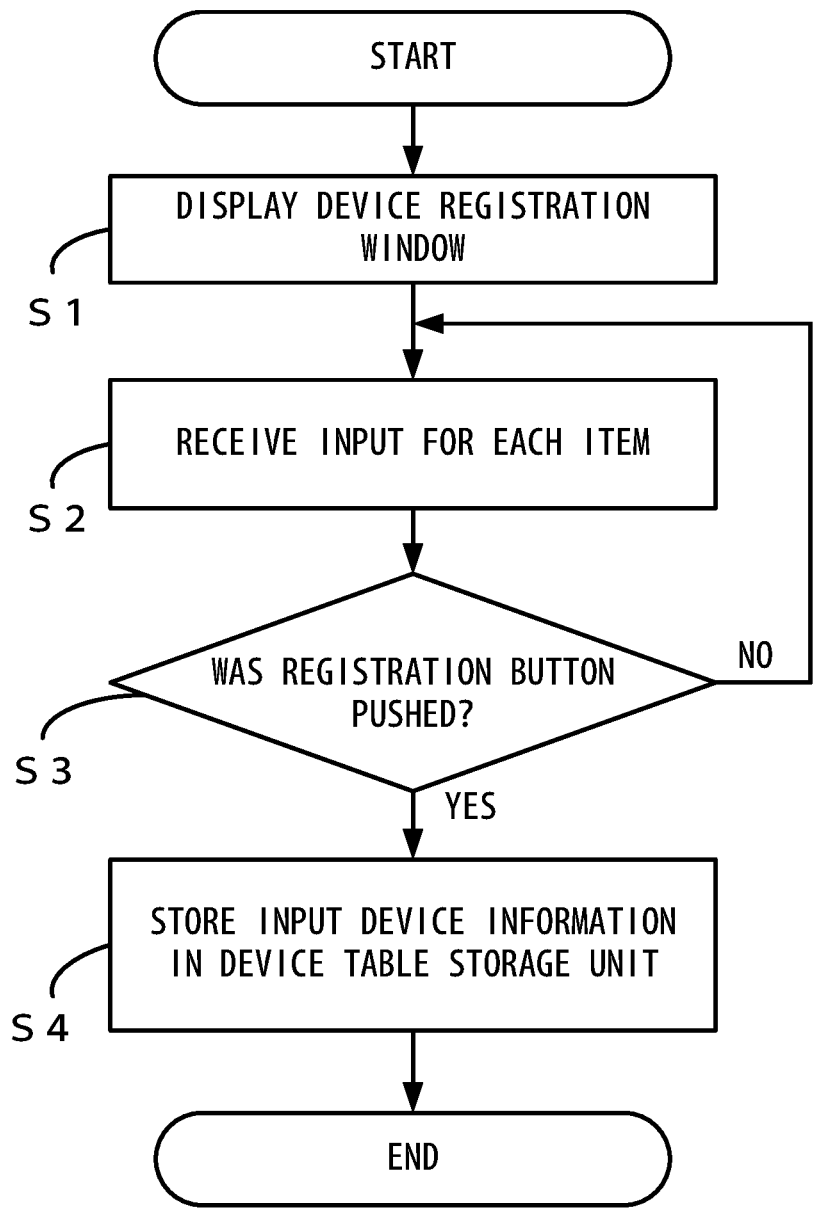
FIG. 17 is a flowchart explaining an example of a device registration process.

Next, explanations will be given for the flowcharts for various types of processes in the embodiment. FIG. 17 illustrates a flowchart for an example of a process of registering the network device 3 (device registration process). The display control unit 21 conducts control of displaying, in the display unit 14, the device registration window 40 as illustrated in the example of FIG. 7 (step S1).

The administrator conducts inputs for the items in the device registration window 40 by using the mouse or the keyboard. The management device control unit 11 receives the inputs for the items in the device registration window 40 (step S2).

The management device control unit 11 determines whether the registration button 40B has been pushed (step S3). When the management device control unit 11 does not recognize that the registration button 40B has been pushed, (No in step S3), the process returns to step S2.

When the management device control unit 11 has recognized that the registration button 40B has been pushed (Yes in step S3), the management device control unit 11 stores, in the device table storage unit 31, information related to the network device 3 for which the inputs were received (step S4). Thereby, the new network device 3 is registered in the device table.

Next, explanations will be given for a process of registering a command template file name in the function table (function table registration process). FIG. 18 is a flowchart illustrating an example of a command template file registration process. The display control unit 21 displays, in the display unit 14, the function registration window 41 as illustrated in the example of FIG. 8.

The administrator inputs pieces of information to the respective items for function name, device group and command template in the function registration window 41. The management device control unit 11 receives the input of these pieces of information.

For the item of command template, a command template file name to be registered is input. In the template file storage unit 34, the command template file corresponding to a command template file name is stored.

By receiving the input of a command template file name, the management device control unit 11 specifies the command template file as a command template file to be registered (step S11). When a command template file is specified, the management device control unit 11 obtains that command template file from the template file storage unit 34.

The management device control unit 11 obtains the function name and the device group ID from the command template file (step S12). The management device control unit 11 registers the command template file name in the function table in the function table storage unit 32 in a manner that the command template filename is associated with the obtained function name and device group ID (step S13). Thereby, a new command template file name is registered in the function table.

Figure 20:
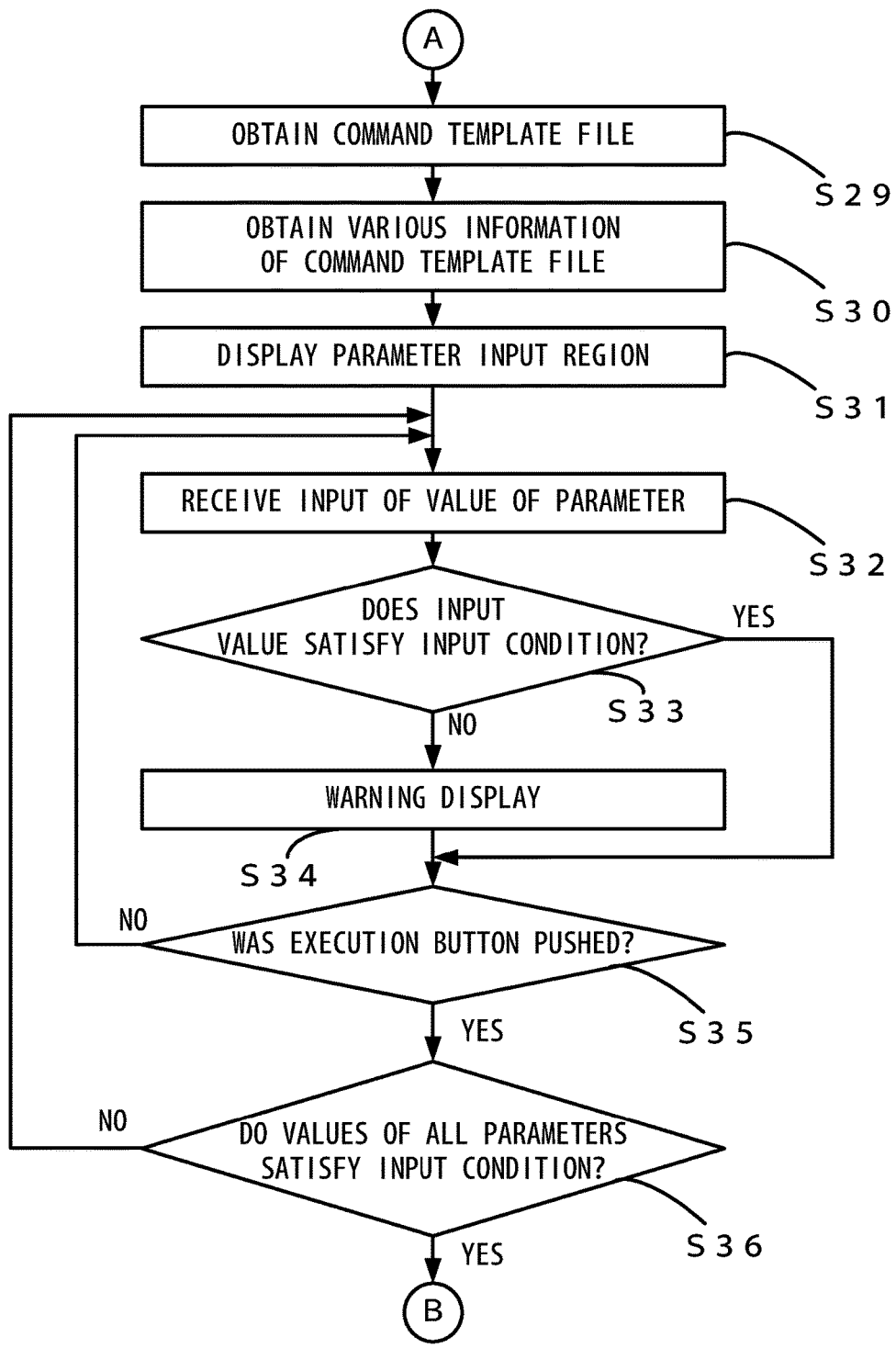
FIG. 20 is a flowchart explaining an example of a command execution process (second)
Figure 21:
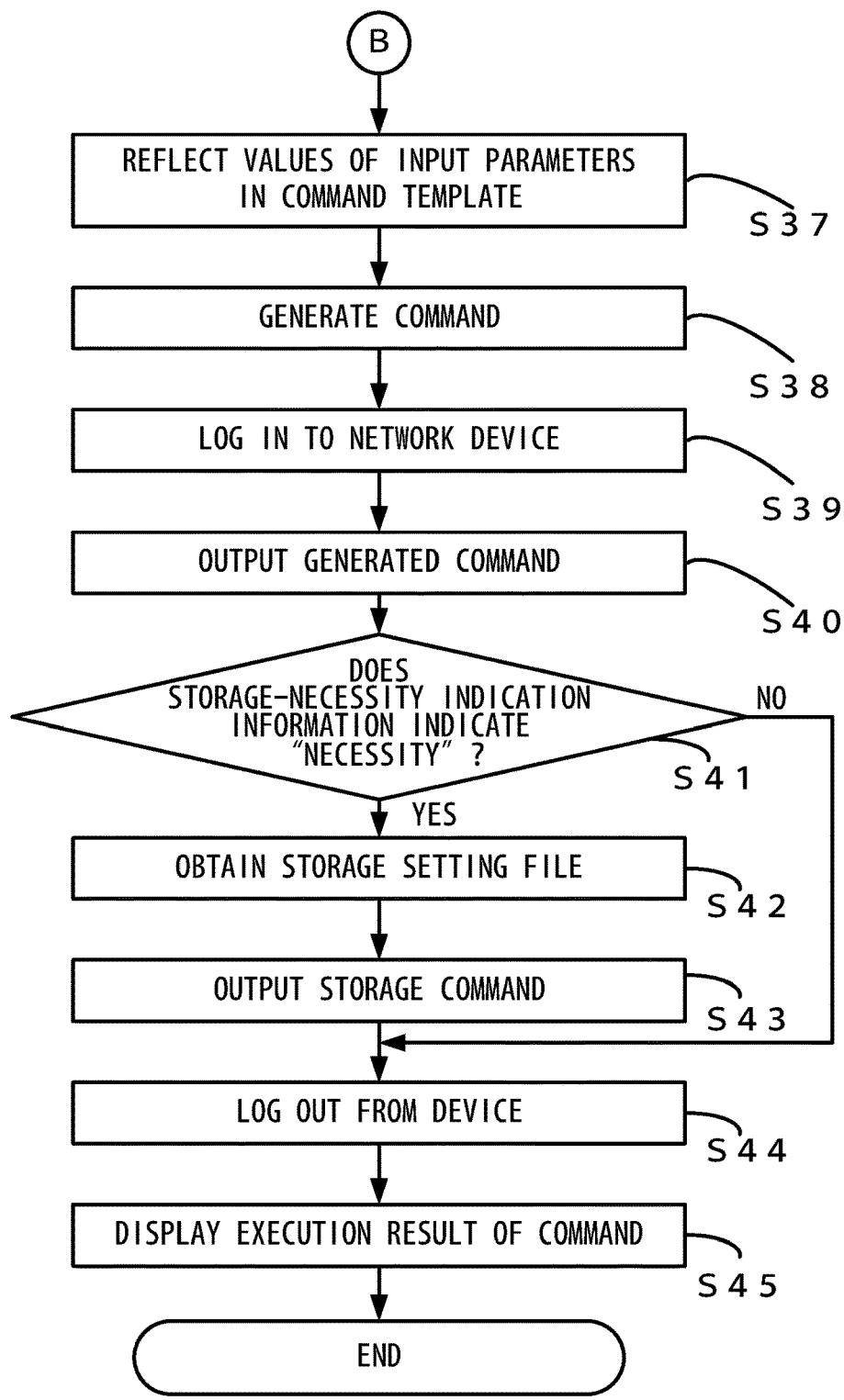
FIG. 21 is a flowchart explaining an example of a command execution process (third)

Next, by referring to the flowcharts illustrated in FIG. 19 through FIG. 21, an example of a command execution process will be explained. The display control unit 21 displays in the display unit 14 the function performing window 42 illustrated in in the example of FIG. 9 (step S21).

The management device control unit 11 determines whether a device ID has been input (step S22). When the management device control unit 11 has not received the input of a device ID, (No in step S22), the process does not proceed to the next step.

When the management device control unit 11 has received the input of a device ID (Yes in step S22), the device group identification unit 22 recognizes the input device ID (step S23).

The management device control unit 11 obtains, from the device table stored in the device table storage unit 31, various types of pieces of information associated with the input device ID (step S23). These various types of pieces of information include a device group ID, an IP address, an administrator ID and an administrator password.

The device group identification unit 22 identifies the device group ID associated with the device ID from among the various types of pieces of information obtained by the management device control unit 11 (step S24).

The display control unit 21 obtains the function name associated with the device group ID identified by the device group identification unit 22, from the function table stored in the function table storage unit 32. The display control unit 21 displays, in the function performing window 42, obtained function names in a listed manner (step S25).

The management device control unit 11 determines whether the function name has been specified (step S26). When the management device control unit 11 has not received the specifying of a function name (No in step S26), the process does not process to the next step.

When the management device control unit 11 has received the specifying of a function name (Yes in step S26), the command template identification unit 23 recognizes the specified function name (step S27). Also, the command template identification unit 23 recognizes the device group ID identified by the device group identification unit 22.

The command template identification unit 23 refers to the function table stored in the function table storage unit 32 so as to identify the command template file name associated with the specified function name and the device group ID identified by the device group identification unit 22. Thereby, the command template is identified (step S28). Then, the process proceeds to "A".

By referring to the flowchart illustrated in FIG. 20, the explanations will be given for the processes following "A". The command execution unit 24 obtains, from the template file storage unit 34, the command template file with the command template file name identified in step S28 (step S29).

The command execution unit 24 obtains various types of pieces of information described in the data of the obtained command template file (step S30). Various types of pieces of information obtained by the command execution unit 24 includes a function name, a storing-necessity indication information, an execution permission authority, a command template description portion and a parameter definition.

The display control unit 21 displays the parameter display region R1 in the function performing window 42 (step S31). On the basis of the command template description portion obtained by the command execution unit 24, the display control unit 21 displays, in the parameter display region R1, items for which parameters are input.

The management device control unit 11 receives inputs of the values of the parameters (step S32). The display control unit 21 determines whether the values of the input parameters satisfy the input conditions (step S33).

When the value of an input parameter does not satisfy the input condition (No in step S33), the display control unit 21 conducts warning display in the display unit 14 (step S34). For example, the display control unit 21 changes the background color of the item of which a value not satisfying the input condition has been input.

When the values of the input parameters satisfy the input conditions (Yes in step S33), the process in step S34 is not performed. The management device control unit 11 determines whether the execution button 42B has been pushed in the function performing window 42 (step S35).

When the management device control unit 11 has not received the manipulation of pushing the execution button 42B (No in step S35), the process returns to step S32. When the management device control unit 11 determines that the execution button 42B has been pushed (Yes in step S35), the management device control unit 11 determines whether the values of all input parameters satisfy the input conditions (step S36).

When at least one of the values of the input parameters does not satisfy the input condition (No in step S36), the process returns to step S32. When all the values of the input parameters satisfy the input conditions (Yes in step S36), the process proceeds to "B".

By referring to the flowchart illustrated in FIG. 21, the processes after "B" will be explained. The command execution unit 24 reflects the values of the input parameters in the command template description portion of the command template file (step S37). Thereby, the command execution unit 24 generates a command that is to be executed (step S38).

In step S23, the management device control unit 11 has obtained, from the device table stored in the device table storage unit 31, the IP address, the administrator ID and the administrator password associated with the device ID.

On the basis of the above IP address, the command execution unit 24 accesses, via the communication unit 15, the network device 3 identified by the device ID. Then, the command execution unit 24 uses the above administrator ID and administrator password so as to login to the network device 3 (step S39).

The command execution unit 24 outputs, via the communication unit 15, the command generated in step S38 to the network device 3 to which the command execution unit 24 has logged in (step S40). The network device 3 executes the input command. Thereby, the management device 2 makes the network device 3 perform the function that is implemented by the command.

In step S30, the command execution unit 24 has obtained the information of the storing-necessity indication information of the command template file. The command execution unit 24 determines whether the storing-necessity indication information indicates "necessity" (step S41).

In the storage unit 12, a storage setting file that has set a storage command for storing the result of a function performed by the network device 3 is stored. When the storing-necessity indication information indicates "necessity" (Yes in step S41), the command execution unit 24 obtains a storage setting file from the storage unit 12 (step S42).

The command execution unit 24 generates a storage command from the storage setting file, and outputs the generated command to the network device 3 to which the command execution unit 24 has logged in (step S24). The network device 3 executes the input storage command. Thereby, the network device 3 stores the result of executing a function.

When the storing-necessity indication information does not indicate "necessity" (No in step S41), the process in step S42 or S43 is not executed. The network device 3 outputs the result of executing the command to the management device 2.

The communication unit 15 inputs the result of executing the command. When the communication unit 15 has input the result of executing the command, the management device 2 logs out from the network device 3 to which it has logged in (step S44). Then, the display control unit 21 displays the execution result of the command in the display unit 14 (step S45).

<First Variation Example>

Figure 22:
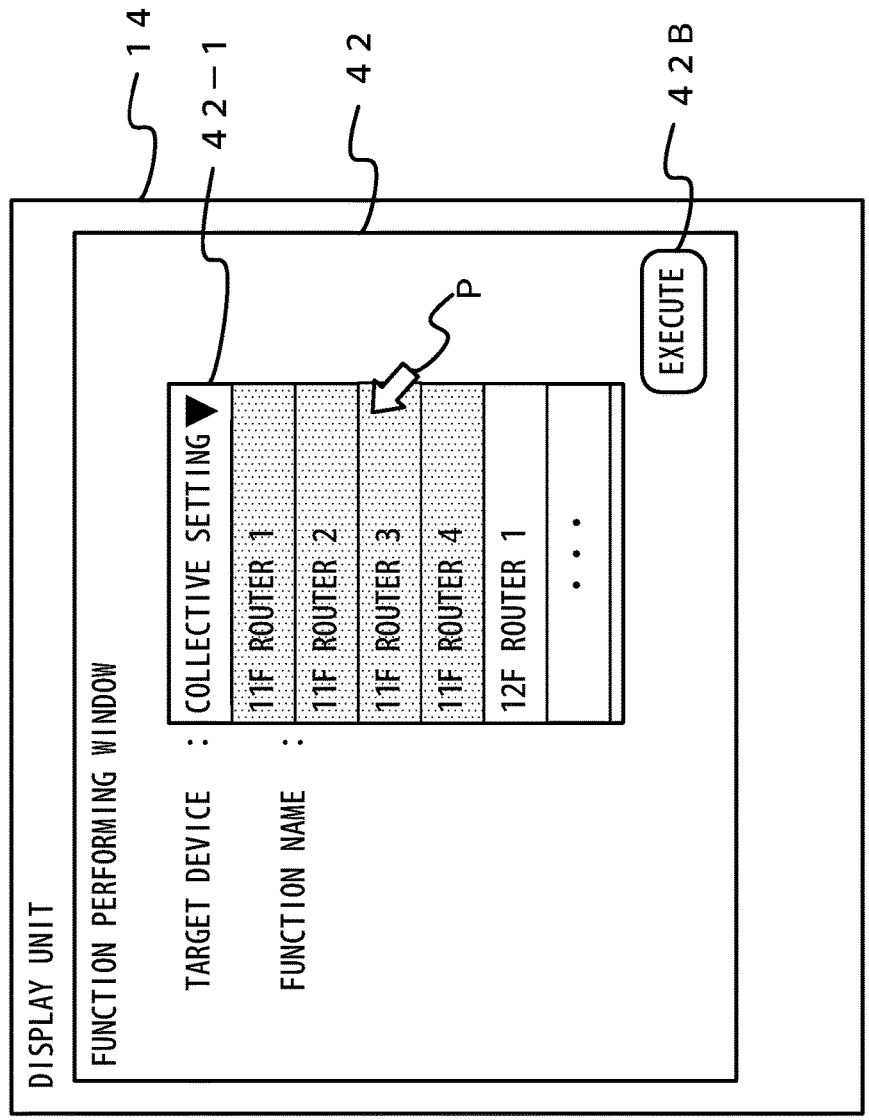
FIG. 22 illustrates an example of a function performing window according to a first variation example.

Next, by referring to FIG. 22 and FIG. 23, a first variation example will be explained. In the example illustrated in FIG. 22, the display control unit 21 has conducted control of displaying, in the function performing window 42 in a listed manner, devices that are to be made to perform functions.

The display control unit 21 obtains each device ID registered in the device table stored in the device table storage unit 31. Then, the display control unit 21 displays the obtained device IDs in the function performing window 42 in a listed manner.

Also, the display control unit 21 displays the field of "collective setting". A plurality of device IDs registered in the device table are associated with this "collective setting". For example, all device IDs belonging to one of a plurality of device group IDs may be associated with "collective setting".

When "collective setting" has been selected in the function performing window 42, a plurality of device IDs associated with "collective setting" are selected in a collective manner. The example illustrated in FIG. 22 illustrates a state where four device IDs have been selected.

The flowchart illustrated in FIG. 23 illustrates an example of a process of the first variation example. The display control unit 21 displays a pull-down menu in the item of device in the function performing window 42 (step S51). Thereby, a list as illustrated in the example of FIG. 22 is displayed in the function performing window 42.

The management device control unit 11 determines whether "collective setting" has been selected (step S52). When "collective setting" has been selected (Yes in step S52), the management device control unit 11 specifies a plurality of device IDs that are set in "collective setting" (step S53).

When "collective setting" has not been selected (No in step S52), the process in step S53 is not performed. The management device control unit 11 determines whether a plurality of device IDs have been selected from among device IDs displayed in a listed manner (step S54).

When a plurality of device IDs have been selected (Yes in step S54), the management device control unit 11 specifies the plurality of selected device IDs (step S55). When a plurality of device ID have not been selected (No in step S54), the process in step S55 is not performed.

As described above, a plurality of device IDs are specified. The management device control unit 11 performs the process in and subsequent to step S23 in FIG. 19 for each of the plurality of specified device IDs. Thereby, the management device 2 generates commands for a plurality of network devices 3 in a collective manner (step S56).

Then, by outputting the generated commands to the plurality of network devices 3, the management device 2 can make the plurality of network devices 3 execute the commands in a collective manner.

<Second Variation Example>

Figure 24:
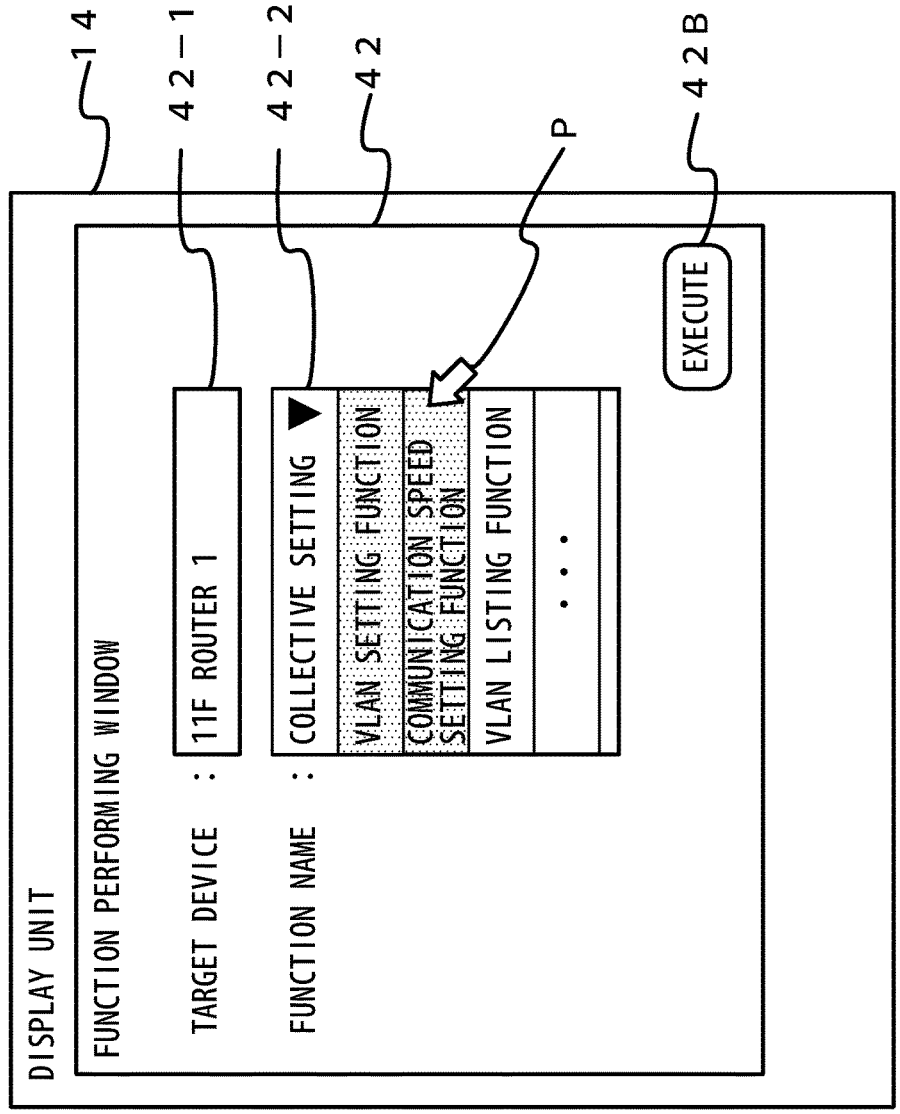
FIG. 24 illustrates an example of a function performing window according to a second variation example.

Next, by referring to FIG. 24 and FIG. 25, a second variation example will be explained. In the example illustrated in FIG. 24, the display control unit 21 has conducted control of displaying, in the function performing window 42 in a listed manner, a plurality of functions that the network devices 3 are to be made to perform.

The display control unit 21 obtains a plurality of function names associated with the device group ID to which the device IDs belong, from among the respective function names registered in the function table stored in the function table storage unit 32. Then, the display control unit 21 displays the obtained plurality of function names in the function performing window 42 in a listed manner.

Also, the display control unit 21 displays the field of "collective setting". A plurality of function names are associated with this "collective setting". For example, all function names associated with the device group ID to which the device IDs belong may be set in "collective setting".

When "collective setting" has been selected in the function performing window 42, a plurality of function names associated with "collective setting" are selected in a collective manner. The example illustrated in FIG. 24 illustrates a state where two function names have been selected.

Figure 25:
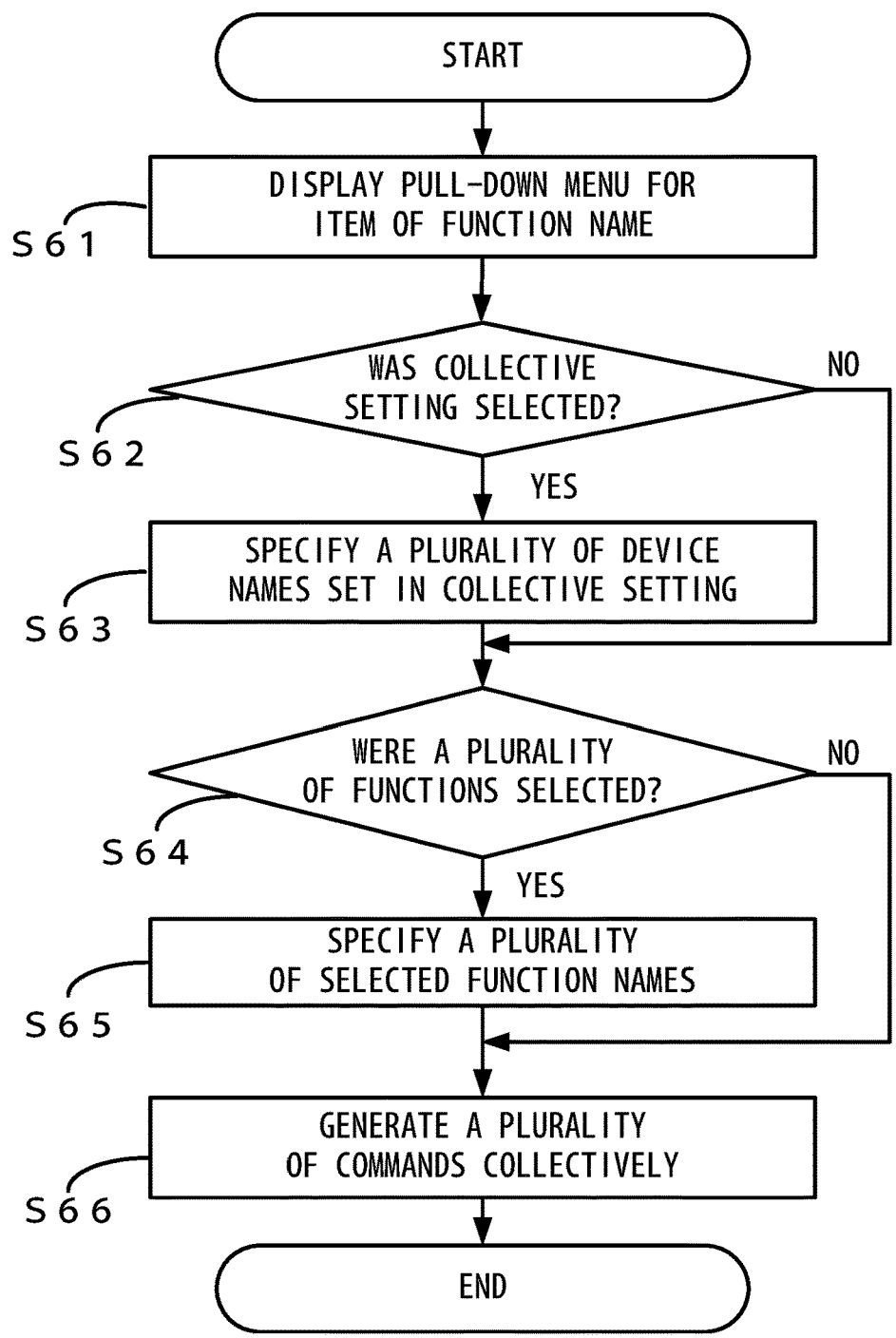
FIG. 25 is a flowchart explaining an example of a process according to the second variation example.

The flowchart illustrated in FIG. 25 illustrates an example of a process of the second variation example. The display control unit 21 displays a pull-down menu in the item of function name in the function performing window 42 (step S61). Thereby, a list as illustrated in the example of FIG. 24 is displayed in the function performing window 42.

The management device control unit 11 determines whether "collective setting" has been selected (step S62). When "collective setting" has been selected (Yes in step S62), the management device control unit 11 specifies a plurality of function names that are set in "collective setting" (step S63).

When "collective setting" has not been selected (No in step S62), the process in step S63 is not performed. The management device control unit 11 determines whether a plurality of function names have been selected from among the respective function names displayed in a listed manner (step S64).

When the plurality of function names have been selected (Yes in step S64), the management device control unit 11 specifies the plurality of specified function names (step S65). When a plurality of function names have not been selected (No in step S64), the process in step S65 is not performed.

As described above, a plurality of function names are specified. The management device control unit 11 performs the processes in and subsequent to step S27 in FIG. 19 for each of the plurality of specified function names. Thereby, the management device 2 generates a plurality of commands for the network devices 3 in a collective manner (step S66).

Then, by outputting the plurality of generated commands to the network devices 3, the management device 2 can make the network devices 3 execute a plurality of functions based on a plurality of commands in a collective manner.

When the first and second variation examples are combined, the management device 2 collectively outputs commands for making the plurality of network devices 3 execute a plurality of functions. Thereby, the plurality of network devices 3 can perform a plurality of functions in a collective manner.

Also, in the second variation example, the command execution unit 24 may generate a command that specifies the order of the plurality of selected functions. When for example "VLAN setting function" and "communication speed setting function" have been selected, the command execution unit 24 may make the network device 3 perform "VLAN setting function" and thereafter generate a command for making the network device 3 perform "communication speed setting function".

<Example of Hardware Configuration of Management Device>

Figure 26:
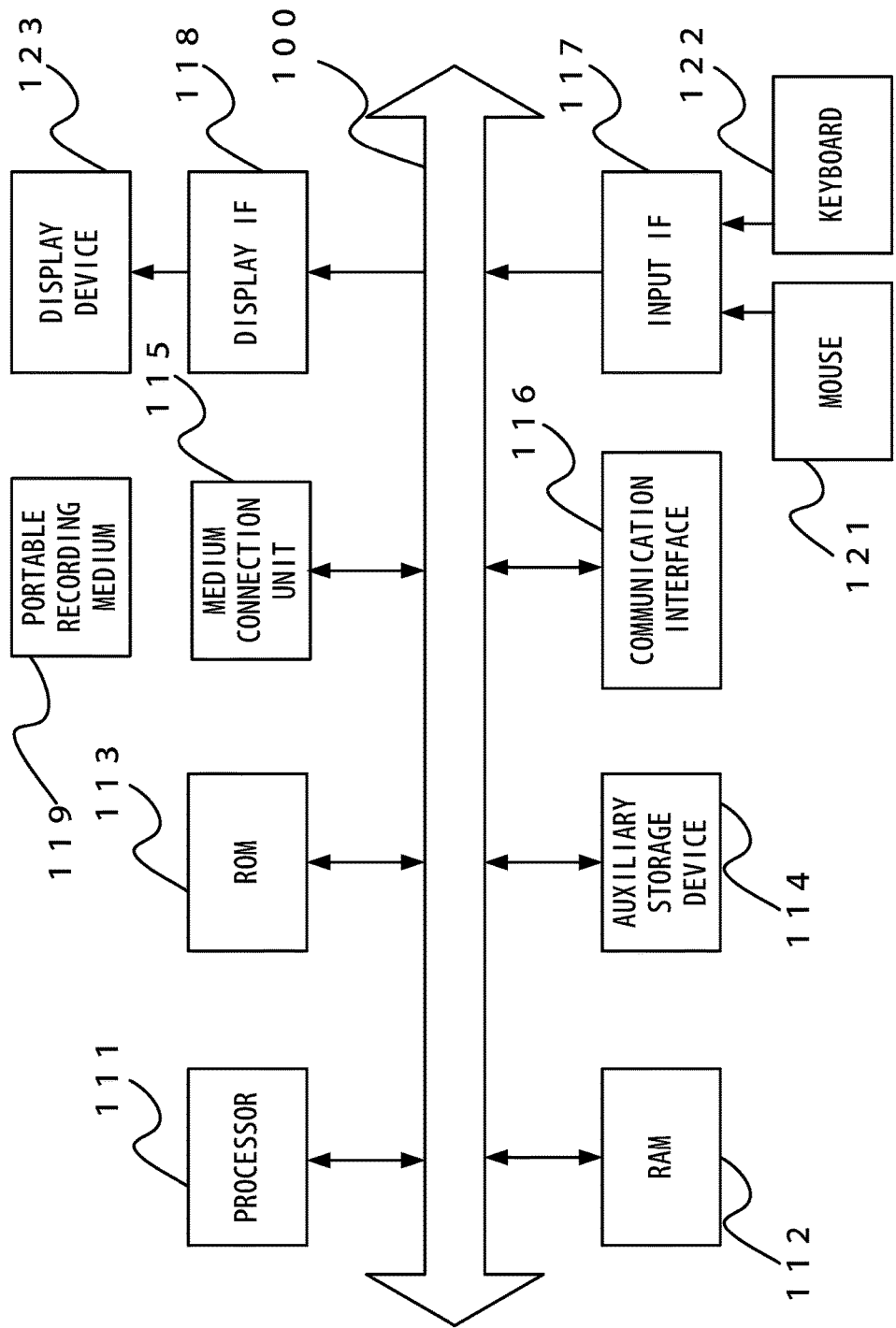
FIG. 26 illustrates an example of a hardware configuration of the management device.

Next, an example of a hardware configuration of the management device 2 will be explained by referring to the example illustrated in FIG. 26. As illustrated in the example of FIG. 26, a processor 111, a RAM 112, a ROM 113, an auxiliary storage device 114, a medium connection unit 115, a communication interface 116, an input interface 117 and a display interface 118 are connected to a bus 100. In FIG. 26, the interfaces appear also as "IF" as their abbreviations.

The processor 111 is an arbitrary processing circuit. The processor 111 executes a program developed in the RAM 112. As a program to be executed, a program that implements the processes in the embodiment may be used. The ROM 113 and the RAM 112 are non-volatile storage devices that store a program developed in the RAM 112.

The auxiliary storage device 114 is a storage device that stores various types of pieces of information, and a hard disk drive, a semiconductor memory, etc. for example may be applied to the auxiliary storage device 114. The medium connection unit 115 is provided in such a manner that it can be connected to a portable recording medium 119.

As the portable recording medium 119, a portable memory or an optical disk (such as a Compact Disc (CD), a Digital Versatile Disk (DVD), etc.) may be used. A program that implements the processes of the embodiment may be stored in the portable recording medium 119.

The input interface 117 is connected to a mouse 121 and a keyboard 122. The display interface 118 is connected to a display device 123.

Among the respective units in the management device 2, the management device control unit 11 may be implemented by the processor 111, the communication unit 15 may be implemented by the communication interface 116, the storage unit 12 may be implemented by the RAM 112 or the auxiliary storage device 114, the input unit 13 may be implemented by the mouse 121 or the keyboard 122, and the display unit 14 may be implemented by the display device 123.

The RAM 112, the ROM 113, the auxiliary storage device 114 and the portable recording medium 119 are examples of a computer-readable tangible recording medium. None of these tangible recording media is a transitory medium such as a signal carrier wave.

<Others>

According to the embodiment, the number of templates used for generating commands can be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a command generation program for causing a computer to execute a process comprising:
   permitting specifying of allowing devices of different types to belong to a same device group to which command templates that share a same command system for instructing execution of a particular function are applied;
   receiving specifying of a device that is to belong to the device group and specifying of the particular function that the device is made to perform; and
   generating a command that is applied to the device group to which the specified device belongs and that is used for controlling the specified device on the basis of a particular command template for performing the particular function.

2. The non-transitory computer-readable recording medium according to claim 1, wherein
   the device group is associated with a command system of the command.

3. The non-transitory computer-readable recording medium according to claim 1, wherein
   the process further comprises
      making a display unit display an input window of a parameter corresponding to the particular command template, and
      generating the command on the basis of an input parameter and the particular command template.

4. The non-transitory computer-readable recording medium according to claim 3, wherein
   the process further comprises
      making the specified device execute the generated command.

5. The non-transitory computer-readable recording medium according to claim 1, wherein
   the process further comprises
      receiving specifying of the plurality of devices, and
      generating the plurality of commands in a collective manner on the basis of a command template for each of the plurality of specified devices.

6. The non-transitory computer-readable recording medium according to claim 1, wherein
   the process further comprises
      receiving specifying of the plurality of functions, and
      generating the plurality of commands in a collective manner on the basis of a command template corresponding to each of the plurality of specified functions.

7. The non-transitory computer-readable recording medium according to claim 3, wherein
   the process further comprises
      making the input window display a first item that receives specifying of the device and a second item that receives specifying of the function, and
      making the input window display a third item that receives input of a parameter that is reflected in a command template associated with a specified device and a specified function when specifying of a device for the first item and specifying of a function for the second item are received.

8. The non-transitory computer-readable recording medium according to claim 7, wherein
   the process further comprises
      displaying, in the second item, a list of functions for selection of a function associated with a device group to which a specified device belongs, when specifying of a device for the first item is received.

9. The non-transitory computer-readable recording medium according to claim 3, wherein
   the process further comprises
      displaying a warning in the display unit when a parameter input to the input window does not satisfy an input condition for the parameter included in the command template.

10. A command generation method conducted by a computer, the command generation method comprising:
    permitting specifying of allowing devices of different types to belong to a same device group to which command templates that share a same command system for instructing execution of a particular function are applied;
    receiving specifying of a device that is to belong to the device group and specifying of the particular function that the device is made to perform; and
    generating a command that is applied to the device group to which the specified device belongs and that is used for controlling the specified device on the basis of a particular command template for performing the particular function.

11. An information processing apparatus comprising:
    a storage device; and
    a processor configured to execute a process including:
       storing, in the storage device, a device group to which command templates that share a same command system for instructing execution of a particular function are applied and in which specifying of allowing devices of different types to belong to the same device group is permitted over a plurality of types of devices and device information corresponding to the device group;

storing, in the storage device, the device group, function information and the command templates including a variable parameter corresponding the function information in an associated manner;

identifying a device group corresponding to device information stored in the storage device from input device information;

identifying a command template including a variable parameter stored in the storage device from input function information and the identified device group;

displaying a window for inputting a value of a variable parameter on the basis of an identified command template; and generating a command obtained by reflecting a value of an input variable parameter in a command template, and makes a device corresponding to the device information execute the generated command.

* * * * *